United States Patent
Fujimoto et al.

(10) Patent No.: US 8,170,768 B2
(45) Date of Patent: May 1, 2012

(54) SLIP RATIO ESTIMATING DEVICE AND SLIP RATIO CONTROL DEVICE

(75) Inventors: Hiroshi Fujimoto, Yokohama (JP); Kiyoshi Fujii, Yokohama (JP)

(73) Assignee: Yokohama National University, Yokohama-shi (JP)

( * ) Notice: Subject to any disclaimer, the term of this patent is extended or adjusted under 35 U.S.C. 154(b) by 407 days.

(21) Appl. No.: 12/438,846

(22) PCT Filed: Mar. 5, 2007

(86) PCT No.: PCT/JP2007/054220
§ 371 (c)(1),
(2), (4) Date: Apr. 20, 2009

(87) PCT Pub. No.: WO2008/029524
PCT Pub. Date: Mar. 13, 2008

(65) Prior Publication Data
US 2009/0210128 A1 Aug. 20, 2009

(30) Foreign Application Priority Data
Sep. 7, 2006 (JP) ................................. 2006-243454

(51) Int. Cl.
*B60T 7/12* (2006.01)

(52) U.S. Cl. ....................................................... 701/90

(58) Field of Classification Search .................... 701/70, 701/74, 82, 84, 90; 180/197
See application file for complete search history.

(56) References Cited

U.S. PATENT DOCUMENTS

| 5,961,565 A * | 10/1999 | Kawabe et al. ................. 701/90 |
| 2005/0038589 A1 * | 2/2005 | Shukla ............................. 701/80 |
| 2005/0274560 A1 * | 12/2005 | Wakao et al. ................. 180/197 |

FOREIGN PATENT DOCUMENTS

| JP | 2001-008305 | 1/2001 |
| JP | 2006-115644 | 4/2006 |
| JP | 2006-136177 | 5/2006 |
| JP | 2006-149023 | 6/2006 |

OTHER PUBLICATIONS

Shinichiro Sakai et al., "Study of New Vehicle Motion Control of Electric Vehicle", Dissertation of The University of Tokyo, 1999, pp. 7-10 (with partial English-language translation).
Kantaro Yoshimoto et al., "Method of Estimating Wheel Slip Rate of Electric Vehicle", Convention of the Industry Applications Department of the Institute of Electrical Engineers of Japan, 2000, vol. 2, pp. 561-564 (with partial English-language translation).

(Continued)

*Primary Examiner* — Kim T Nguyen
(74) *Attorney, Agent, or Firm* — Venable LLP; Michael A. Sartori; Leigh D. Thelen

(57) ABSTRACT

The present invention provides a slip rate estimating device measuring a slip ratio without the need for a body speed and a slip ratio control device using the slip ratio estimating device. A motor torque measured by a torque measuring instrument is input to each of a vehicle model (601) and an SRE (602) that performs calculations including time differentiation of the slip ratio. The vehicle model (601) derives a wheel rotation speed, a wheel rotation acceleration, and a body speed. The vehicle model (601) outputs the wheel rotation speed and the wheel rotation acceleration to the SRE (602). The SRE (602) outputs the slip ratio based on the motor torque, the wheel rotation speed, and the wheel rotation acceleration.

10 Claims, 40 Drawing Sheets

OTHER PUBLICATIONS

Yoshimasa Tsuruoka et al., "Basic Study of Traction Control of Electric Vehicle", Journal of the Institute of Electrical Engineers of Japan, 1998, vol. 118-D, No. 1, pp. 44-50 (with partial English-language translation).

H.B. Pacejka et al., "The Magic Formula Tyre Model", Proc. 1st International Colloquium on Tyre Models for Vehicle Dynamics Analysis, Held in Delft, The Netherlands, Oct. 21-22, 1991.

Takeo Saito et al., "Method of Stabilizing and Controlling Steering of Electric Vehicle Using Slip Rate and Yaw Moment Observer", 2003, Industrial Measurement Control Workshop of the Institute of Electrical Engineers of Japan, IIC-03-52, pp. 41-46 (with partial English-language translation).

Y. Hori, "Traction Control of Electric Vehicle—Basic Experimental Results using the Test EV 'UOT Electric March II'", IEEE Trans. on Industry Applications, 1998, vol. 34, No. 5, pp. 1131-1138.

* cited by examiner

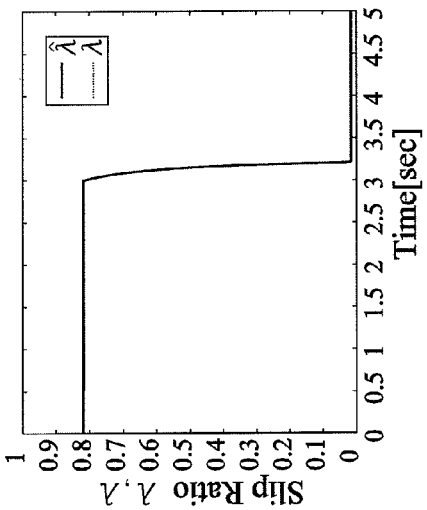
FIG.9A ESTIMATION BASED ON SEQUENTIAL LEAST SQUARES METHOD
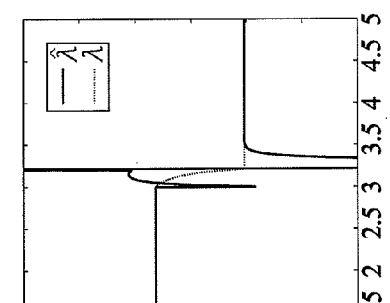
FIG.9B ESTIMATION BASED ON DISTURBANCE OBSERVER
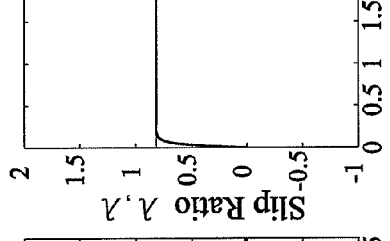
FIG.9C ESTIMATION USING PROPOSED ESTIMATOR
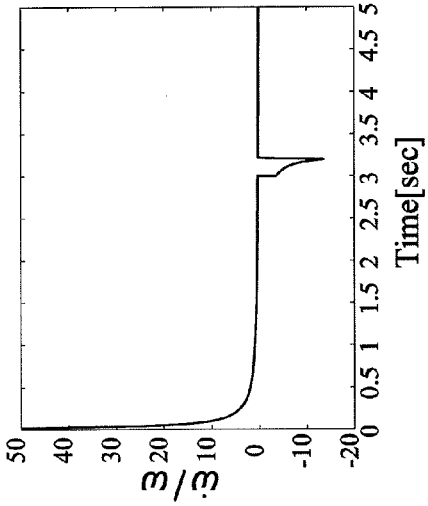
FIG.9D SEQUENTIAL LEAST SQUARES METHOD AND $y$ AND $\xi$
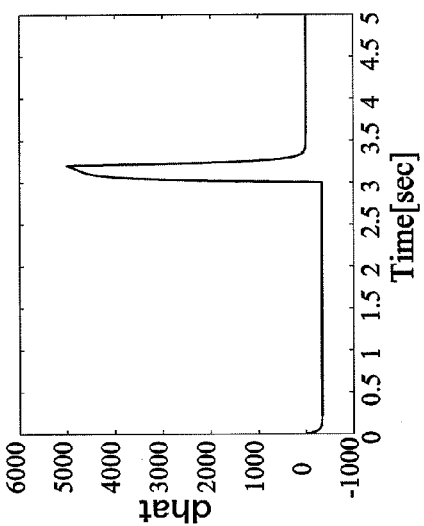
FIG.9E $\hat{d}$ IN CASE OF DISTURBANCE OBSERVER
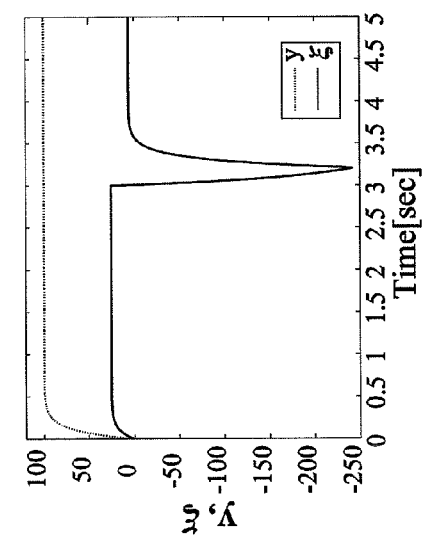
FIG.9F $\dot{\omega}/\omega$ IN CASE OF ESTIMATOR

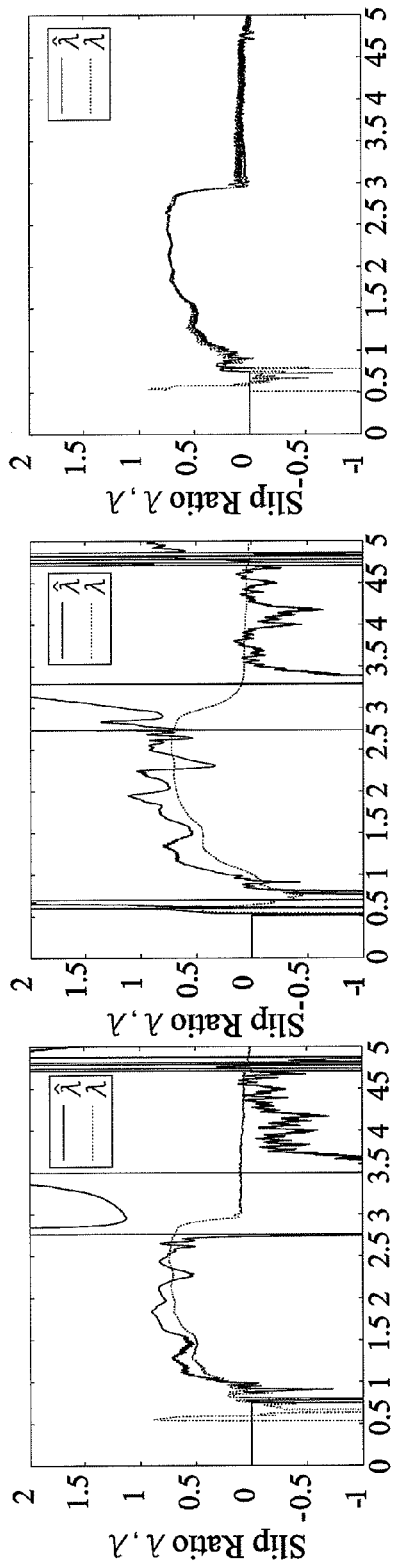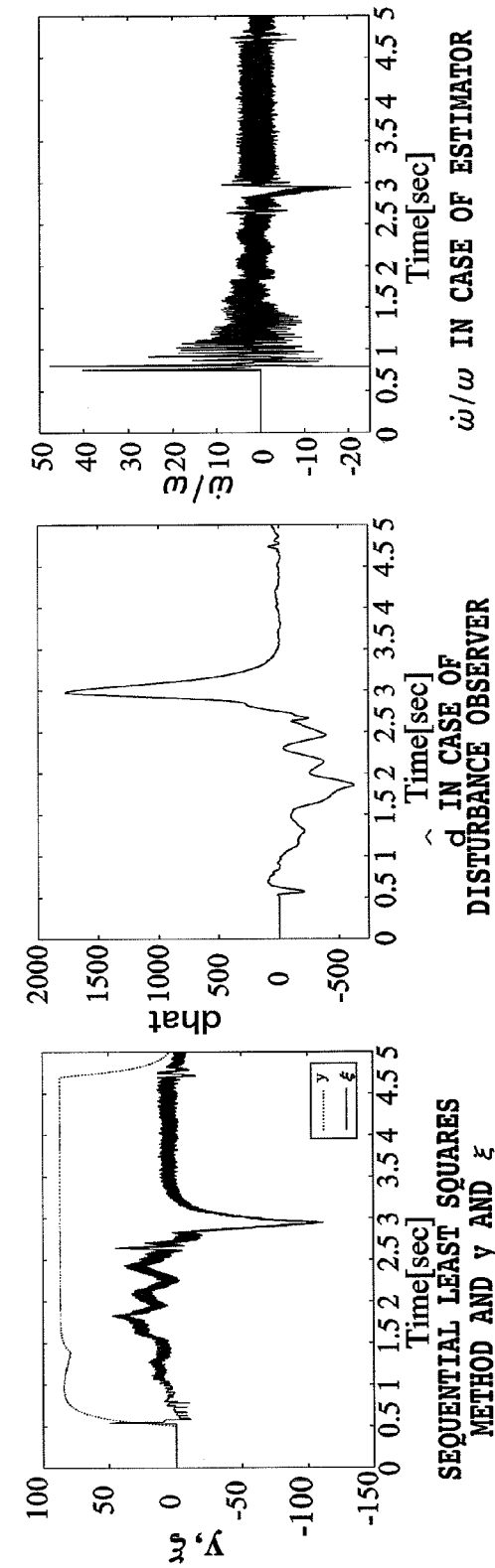

COMPARISON OF SLIP RATIO

COMPARISON OF WHEEL SPEED

COMPARISON OF BODY SPEED

SLIP RATIO ESTIMATING DEVICE AND SLIP RATIO CONTROL DEVICE

TECHNICAL FIELD

The present invention relates to a slip ratio estimating device and a slip ratio control device, and more specifically, to a slip ratio estimating device and a slip ratio control device which do not use a body speed.

BACKGROUND ART

Electric vehicles (EVs) have advantages over current internal combustion engine vehicles (ICEVs) in that the EV helps solve energy problems and environmental problems and offers a torque response several hundred times as quick as that of the ICEV, enabling a generated torque to be accurately determined. These advantages relate to a motor and are inherent in the electric vehicle, which utilizes a motor as a driving force. Paying much attention to these advantages enables vehicle control that is impossible for the ICEV. Efforts have also been made to perform traction control based on these advantages of the motor (see Non-Patent Documents 1 and 2).

Measurement of a body speed is essential for measuring a slip ratio that is an important variable for implementing the traction control. The measurement of the body speed requires installation of a fifth wheel, or mounting of a sensor on a non-drive wheel for measurement of the rotation speed of the wheel, or integration of values obtained from an acceleration sensor.

However, disadvantageously, the installation of the fifth wheel is very difficult. Furthermore, if the acceleration sensor is used, noise or offset associated with integration may occur, making precise measurement difficult. The method of mounting the sensor on the non-drive wheel to measure the body speed based on the rotation speed of the wheel is also disadvantageous in that the body speed cannot be measured during braking, in that if the front wheels of the vehicle are non-drive wheels, the body speed cannot be accurately determined when a steering wheel is turned, and in that the method cannot be applied to four-wheel drive car having no non-drive wheel. Additionally, the sensor mounted on the non-drive wheel disadvantageously increases costs and complicates the system.

The present invention has been made in view of these problems. An object of the present invention is to provide a slip ratio estimating device that estimates the slip ratio without the need for the body speed and a slip ratio control device that uses the slip ratio estimating device to enable the slip ratio to quickly follow a target value.

Non-Patent Document 1: Kantaro YOSHIMOTO, Atsuo KAWAMURA, "Method of Estimating Wheel Slip Rate of Electric Vehicle", Convention of the Industry Applications Department of the Institute of Electrical Engineers of Japan, 2000, Vol. 2, pp, 561-564

Non-Patent Document 2: Yoshimasa TSURUOKA, Yasushi TOYODA, Yoichi HORI, "Basic Study of Traction Control of Electric Vehicle", Journal of the Institute of Electrical Engineers of Japan, 1998, Vol. 118-D, No. 1, pp. 44-50

Non-Patent Document 3: H. B. Pacejka, and E. Bakker, "The Magic Formula Tyre Model", Proc. 1st International Colloquium on Tyre Models for Vehicle Dynamics Analysis, Held in Delft, The Netherlands, Oct. 21-22, 1991

Non-Patent Document 4: Takeo SAITO, Hiroshi FUJIMOTO, Suchiko NOGUCHI, "Method of Stabilizing and Controlling Steering of Electric Vehicle Using Slip Rate and Yaw Moment Observer", 2003, Industrial Measurement Control Workshop of the Institute of Electrical Engineers of Japan, IIC-03-52, pp. 41-46

Non-Patent Document 5: Y. Hori, "Traction Control of Electric Vehicle-Basic Experimental Results using the Test EV "UOT Electric March II"", IEEE Trans. on Industry Applications, 1998, Vol. 34, No. 5, pp. 1131-1138

Non-Patent Document 6: Shinichiro SAKAI, Yoichi HORI, "Study of New Vehicle Motion Control of Electric Vehicle", Dissertation of The University of Tokyo, 1999

DISCLOSURE OF THE INVENTION

An embodiment of the present invention is a slip ratio estimating device in an automobile using a torque (T) of a motor to drive drive wheels, the slip ratio estimating device having motor torque measuring means for measuring the torque of the motor, the slip ratio estimating device comprising vehicle model calculating means for calculating a drive wheel rotation speed ($\omega$) and a drive wheel rotation acceleration:

$$(\dot{\omega}),\quad\quad\quad\quad\text{[Formula 1]}$$

and slip ratio calculating means for calculating an estimated slip ratio:

$$(\hat{\lambda})\quad\quad\quad\quad\text{[Formula 2]}$$

by using the torque measured by the motor torque measuring means and the rotation speed and rotation acceleration calculated by the vehicle model calculating means to calculate an ordinary differential equation for a slip ratio.

The slip ratio calculating means can calculate the estimated slip ratio by calculating Formula (A) as the ordinary differential equation for the slip ratio.

[Formula 3]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} \quad\quad (A)$$

(r: tire radius of the drive wheel, M: vehicle weight, $J_\omega$: inertia moment of a drive wheel rotating portion)

The slip ratio calculating means can be characterized by performing the calculation by adding a slip ratio observer based on an estimated error in body acceleration to a right side of Formula (A).

The slip ratio estimating device may further have acceleration measuring means for measuring a body acceleration ($a_x$) of the automobile, and the slip ratio calculating means can perform the calculation by adding the slip ratio observer to the right side of Formula (A).

The slip ratio calculating means can calculate Formula (B) in which the slip ratio observer is added to the right side of Formula (A).

[Formula 4]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + k(\hat{\lambda})\left(a_x(t) - \frac{N}{M}\mu(\hat{\lambda})\right) \quad (B)$$

(k: observer gain, N: vertical resistance offered to one wheel, $\mu$: friction coefficient)

Furthermore, another embodiment is a slip ratio estimating device in an automobile using a torque (T) of a motor to drive drive wheels, the slip ratio estimating device having motor torque measuring means for measuring the torque of the motor and acceleration measuring means for measuring a body acceleration ($a_x$) of the automobile, the slip ratio estimating device comprising vehicle model calculating means for calculating a drive wheel rotation speed ($\omega$) and a drive wheel rotation acceleration:

$$(\dot{\omega}), \qquad \text{[Formula 5]}$$

driving force calculating means for calculating an estimated value of a driving force of the automobile, driving resistance calculating means for calculating an estimated value of driving resistance ($F_{dr}$) from the estimated driving force calculated by the driving force calculating means and the body acceleration measured by the acceleration measuring means, and slip ratio calculating means for calculating an estimated slip ratio:

$$(\hat{\lambda}) \qquad \text{[Formula 6]}$$

by using the torque measured by the motor torque measuring means, the rotation speed and rotation acceleration calculated by the vehicle model calculating means, and the estimated driving resistance calculated by the driving resistance calculating means to calculate an ordinary differential equation for a slip ratio.

The slip ratio calculating means can calculate the estimated slip ratio by calculating Formula (C) as the ordinary differential equation for the slip ratio.

[Formula 7]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + \frac{\hat{F}_{dr}}{rM\omega} \qquad (C)$$

(r: tire radius of the drive wheel, M: vehicle weight, $J_\omega$: inertia moment of a drive wheel rotating portion)

The slip ratio calculating means can perform the calculation by adding a slip ratio observer based on an estimated error in body acceleration to a right side of Formula (C).

The slip ratio calculating means can calculate Formula (B) in which the slip ratio observer is added to the right side of Formula (C).

[Formula 8]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} -$$
$$\frac{T}{r^2 M \omega} + \frac{\hat{F}_{dr}}{rM\omega} + k(\hat{\lambda})\left(a_x(t) - \frac{N}{M}\mu(\hat{\lambda}) + \frac{\hat{F}_{dr}}{M}\right) \qquad (D)$$

(k: observer gain, N: vertical resistance offered to one wheel, μ: friction coefficient)

Yet another embodiment is a slip ratio control device in an automobile using torque of a motor to drive drive wheels, the slip ratio control device having means for calculating a torque instruction for the motor and means for controlling the torque of the motor based on the torque instruction, the slip ratio control device comprising proportional-plus-integral control means for calculating a target torque (T) from an input slip ratio, vehicle model calculating means for calculating a drive wheel rotation speed ($\omega$) and a drive wheel rotation acceleration:

$$(\dot{\omega}), \qquad \text{[Formula 9]}$$

and slip ratio calculating means for calculating an estimated slip ratio:

$$(\hat{\lambda}) \qquad \text{[Formula 10]}$$

by using the target torque calculated by the proportional-plus-integral control means and the rotation speed and rotation acceleration of the drive wheels calculated by the vehicle model calculating means to calculate an ordinary differential equation, wherein the slip ratio obtained by subtracting the estimated slip ratio from a desired target slip ratio ($\lambda^*$) is input to the proportional-plus-integral control means, and the means for calculating the torque instruction performs the calculation based on the target torque calculated by the proportional-plus-integral control means.

The proportional-plus-integral control means can perform nonlinear compensation.

The proportional-plus-integral can perform the nonlinear compensation based on:

[Formula 11]

$$T = r^2 M \omega \left(-\frac{\dot{\omega}}{\omega}\lambda + \left(1 + \frac{J_\omega}{r^2 M}\right)\frac{\dot{\omega}}{\omega} + K_p(\lambda^* - \lambda)\right) \qquad (E)$$

(r: tire radius of the drive wheel, M: vehicle weight, $J_\omega$: inertia moment of a drive wheel rotating portion, $K_p$: proportion constant).

The proportional-plus-integral control means can use, for Formula (E), the rotation acceleration of the drive wheels calculated from the target slip ratio and the target torque based on:

[Formula 12]

$$\dot{\omega} = \frac{T}{J_\omega + r^2 M(1 - \lambda^*)} \qquad (F)$$

(r: tire radius of the drive wheel, M: vehicle weight, $J_\omega$: inertia moment of a drive wheel rotating portion).

Still another embodiment is a slip ratio control device in an automobile using torque of a motor to drive drive wheels, the slip ratio control device having means for calculating a torque instruction for the motor and means for controlling the torque of the motor based on the torque instruction, the slip ratio control device comprising proportional-plus-integral control means for calculating a target torque (T) from an input rotation speed of the drive wheels, vehicle model calculating means for calculating a drive wheel rotation speed ($\omega$) and a drive wheel rotation acceleration:

$$(\dot{\omega}) \qquad \text{[Formula 13]}$$

slip ratio calculating means for calculating an estimated slip ratio:

$$(\hat{\lambda}) \qquad \text{[Formula 14]}$$

by using the target torque calculated by the proportional-plus-integral control means and the rotation speed and rotation acceleration of the drive wheels calculated by the vehicle model calculating means to calculate an ordinary differential equation, and body speed calculating means for calculating a body speed from the estimated slip ratio calculated by the slip ratio estimating device and calculating a target rotation speed of the drive wheels with respect to a target slip ratio, from the body speed, wherein the proportional-plus-integral control means varies the control gain according to the estimated slip ratio calculated by the slip ratio calculating means, and the means for calculating the torque instruction performs the calculation based on the target torque calculated by the proportional-plus-integral control means.

The target torque calculating means can determine the control gain using a pole placement method, based on:

[Formula 15]

$$\omega = \frac{1}{(J_\omega + r^2 M(1-\lambda))s} T \quad (G)$$

(r: tire radius of the drive wheel, M: vehicle weight, $J_\omega$: inertia moment of a drive wheel rotating portion).

The slip ratio calculating means can calculate the estimated slip ratio by calculating Formula (A) as the ordinary differential equation for the slip ratio.

[Formula 16]

$$\hat{\lambda} = -\frac{\dot{\omega}}{\omega}\lambda + \left(1 + \frac{J_\omega}{r^2 M}\right)\frac{\dot{\omega}}{\omega} - \frac{T}{r^2 M \omega} \quad (A)$$

(r: tire radius of the drive wheel, M: vehicle weight, $J_\omega$: inertia moment of a drive wheel rotating portion)

The slip ratio estimating means can perform the calculation by adding a slip ratio observer based on an estimated error in body acceleration to a right side of Formula (A).

The automobile further has acceleration measuring means for measuring a body acceleration ($a_x$) of the automobile, and the slip ratio estimating means can perform the calculation by adding the slip ratio observer to the right side of Formula (A).

The slip ratio estimating means can calculate Formula (B) in which the slip ratio observer is added to the right side of Formula (A).

[Formula 17]

$$\hat{\lambda} = -\frac{\dot{\omega}}{\omega}\lambda + \left(1 + \frac{J_\omega}{r^2 M}\right)\frac{\dot{\omega}}{\omega} - \frac{T}{r^2 M \omega} + k(\hat{\lambda})\left(a_x(t) - \frac{N}{M}\mu(\hat{\lambda})\right) \quad (B)$$

(k: observer gain, N: vertical resistance offered to one wheel, μ: friction coefficient)

Further another embodiment is a slip ratio control device in an automobile using torque of a motor to drive drive wheels, the slip ratio control device having means for calculating a torque instruction for the motor, means for controlling the torque of the motor based on the torque instruction, and acceleration measuring means for measuring a body acceleration ($a_x$) of the automobile, the slip ratio control device comprising driving force calculating means for calculating an estimated value of a driving force of the automobile, driving resistance calculating means for calculating an estimated value of driving resistance:

($\hat{F}_{dr}$) [Formula 18]

from the estimated driving force calculated by the driving force calculating means and the body acceleration measured by the acceleration measuring means, proportional-plus-integral control means for calculating the torque (T) from an input slip ratio, vehicle model calculating means for calculating a drive wheel rotation speed (ω) and a drive wheel rotation acceleration:

($\dot{\omega}$), [Formula 19]

and slip ratio calculating means for calculating an estimated slip ratio:

($\hat{\lambda}$) [Formula 20]

by using the target torque calculated by the proportional-plus-integral control means, the rotation speed and rotation acceleration of the drive wheels calculated by the vehicle model calculating means, and the estimated driving resistance calculated by the driving resistance calculating means to calculate an ordinary differential equation for the slip ratio, wherein the slip ratio obtained by subtracting the estimated slip ratio from a desired target slip ratio (λ*) is input to the proportional-plus-integral control means, and the means for calculating the torque instruction performs the calculation based on the target torque calculated by the proportional-plus-integral control means.

The proportional-plus-integral control means can perform nonlinear compensation.

The proportional-plus-integral can perform the nonlinear compensation based on:

[Formula 21]

$$T = r^2 M \omega \left(-\frac{\dot{\omega}}{\omega}\lambda + \left(1 + \frac{J_\omega}{r^2 M}\right)\frac{\dot{\omega}}{\omega} + K_p(\lambda^* - \lambda)\right) \quad (E)$$

(r: tire radius of the drive wheel, M: vehicle weight, $J_\omega$: inertia moment of a drive wheel rotating portion, $K_p$: proportion constant).

The proportional-plus-integral control means can use, for Formula (E), the rotation acceleration of the drive wheels calculated from the target slip ratio and the target torque based on:

[Formula 22]

$$\dot{\omega} = \frac{T}{J_\omega + r^2 M(1-\lambda^*)} \quad (F)$$

(r: tire radius of the drive wheel, M: vehicle weight, $J_\omega$: inertia moment of a drive wheel rotating portion).

A slip ratio control device in an automobile using torque of a motor to drive drive wheels, the slip ratio control device having means for calculating a torque instruction for the motor, means for controlling the torque of the motor based on the torque instruction, and acceleration measuring means for measuring a body acceleration ($a_x$) of the automobile, the slip ratio control device comprising driving force calculating means for calculating an estimated value of a driving force of the automobile, driving resistance calculating means for calculating an estimated value of driving resistance:

($\hat{F}_{dr}$) [Formula 23]

from the estimated driving force calculated by the driving force calculating means and the body acceleration measured by the acceleration measuring means, proportional-plus-integral control means for calculating a target torque (T) from an input rotation speed of the drive wheels, vehicle model calculating means for calculating a drive wheel rotation speed (ω) and a drive wheel rotation acceleration:

($\dot{\omega}$), [Formula 24]

slip ratio calculating means for calculating an estimated slip ratio:

($\hat{\lambda}$) [Formula 25]

by using the target torque calculated by the proportional-plus-integral control means, the rotation speed and rotation acceleration of the drive wheels calculated by the vehicle model calculating means, and the estimated driving resistance calculated by the driving resistance calculating means to calculate an ordinary differential equation for the slip ratio, and body speed calculating means for calculating a target rotation speed of the drive wheels with respect to a desired target slip ratio ($\lambda^*$), from the body speed, wherein the proportional-plus-integral control means can vary the control gain according to the estimated slip ratio calculated by the slip ratio calculating means, and the means for calculating the torque instruction can perform the calculation based on the torque calculated by the proportional-plus-integral control means.

The target torque calculating means can determine the control gain using a pole placement method, based on:

[Formula 26]

$$\omega = \frac{1}{(J_\omega + r^2 M(1-\lambda))s} T \quad (G)$$

(r: tire radius of the drive wheel, M: vehicle weight, $J_\omega$: inertia moment of a drive wheel rotating portion).
The slip ratio calculating means can calculate the estimated slip ratio by calculating Formula (C) as the ordinary differential equation for the slip ratio.

[Formula 27]

$$\dot{\lambda} = -\frac{\dot{\omega}}{\omega}\lambda + \left(1 + \frac{J_\omega}{r^2 M}\right)\frac{\dot{\omega}}{\omega} - \frac{T}{r^2 M \omega} + \frac{\hat{F}_{dr}}{rM\omega} \quad (C)$$

(r: tire radius of the drive wheel, M: vehicle weight, $J_\omega$: inertia moment of a drive wheel rotating portion)
The slip ratio calculating means can perform the calculation by adding a slip ratio observer based on an estimated error in body acceleration to a right side of Formula (C).

The slip ratio calculating means can calculate Formula (B) in which the slip ratio observer is added to the right side of Formula (C).

[Formula 28]

$$\dot{\lambda} = -\frac{\dot{\omega}}{\omega}\lambda + \left(1 + \frac{J_\omega}{r^2 M}\right)\frac{\dot{\omega}}{\omega} - \\ \frac{T}{r^2 M \omega} + \frac{\hat{F}_{dr}}{rM\omega} + k(\hat{\lambda})\left(a_x(t) - \frac{N}{M}\mu(\hat{\lambda}) + \frac{\hat{F}_{dr}}{M}\right) \quad (D)$$

(k: observer gain, N: vertical resistance offered to one wheel, $\mu$: friction coefficient)

Further another embodiment is an automobile using a torque of a motor to drive drive wheels, the automobile comprising the slip ratio estimating device according to any of the above-described embodiments, wherein the torque of the motor can be controlled such that an estimated slip ratio calculated by the slip ratio estimating device has a desired value.

Further another embodiment is an automobile using a torque of a motor to drive drive wheels, the automobile comprising the slip ratio estimating device according to any of the above-described embodiments controlling the torque of the motor.

The present invention enables slip ratio control to be precisely performed such that the slip ratio is accurately estimated without the need for a body speed and such that the target slip ratio is quickly achieved.

BRIEF DESCRIPTION OF THE DRAWINGS

FIG. 9A is a diagram showing the true value and estimated value of the slip ratio in estimation based on the sequential least square method, the values having been obtained by simulation.

FIG. 9B is a diagram showing the true value and estimated value of the slip ratio in estimation based on the disturbance observer, the values having been obtained by simulation.

FIG. 9C is a diagram showing the true value and estimated value of the slip ratio in estimation using a first estimator, the values having been obtained by simulation.

FIG. 9D is a diagram showing parameters y and $\xi$ in the estimation based on the sequential least squares method, the parameters having been obtained by simulation.

FIG. 9E is a diagram showing a disturbance estimated value in the estimation based on the disturbance observer, the value having been obtained by simulation.

FIG. 9F is a diagram showing:

$$\frac{\dot{\omega}}{\omega} \quad \text{[Formula 29]}$$

in the estimation based on the disturbance observer, the value having been obtained by simulation.

Figure 10:
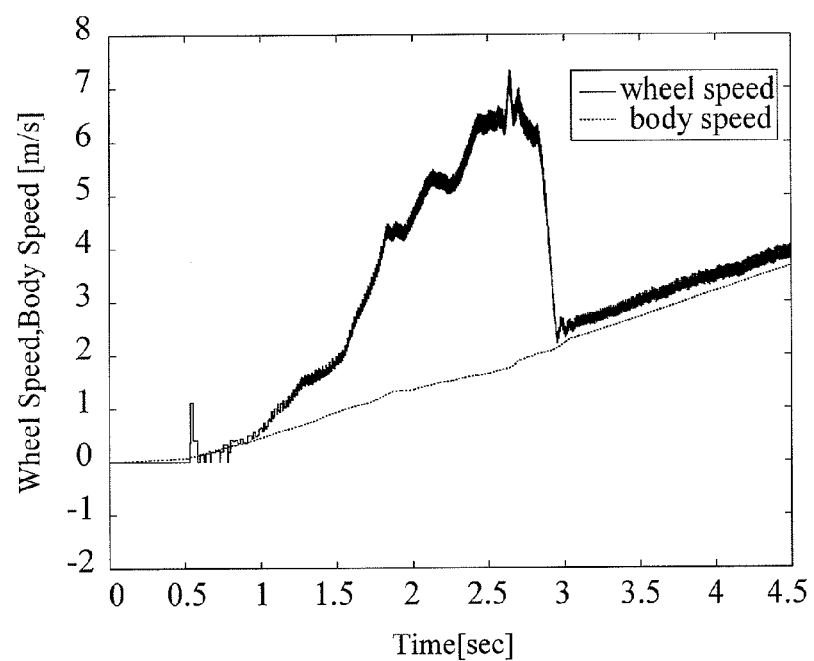

FIG. 10 is a diagram showing experimental results for a body speed and a wheel speed obtained when a vehicle traveled without being subjected to the slip ratio control.

FIG. 11A is a diagram showing the true value and estimated value of the slip ratio in the estimation based on the sequential least square method, the values having been obtained by experiments using a real vehicle.

FIG. 11B is a diagram showing the true value and estimated value of the slip ratio in the estimation based on the disturbance observer, the values having been obtained by experiments using the real vehicle.

FIG. 11C is a diagram showing the true value and estimated value of the slip ratio in the estimation using the first estimator, the values having been obtained by experiments using the real vehicle.

FIG. 11D is a diagram showing the parameters y and ξ in estimation based on the sequential least squares method, the parameters having been obtained by experiments using the real vehicle.

FIG. 11E is a diagram showing the disturbance estimated value in the estimation based on the disturbance observer, the value having been obtained by experiments using the real vehicle.

FIG. 11F is a diagram showing:

$$\frac{\dot{\omega}}{\omega} \quad [\text{Formula 30}]$$

in the estimation using the first estimator, the value having been obtained by experiments using the real vehicle.

Figure 12:
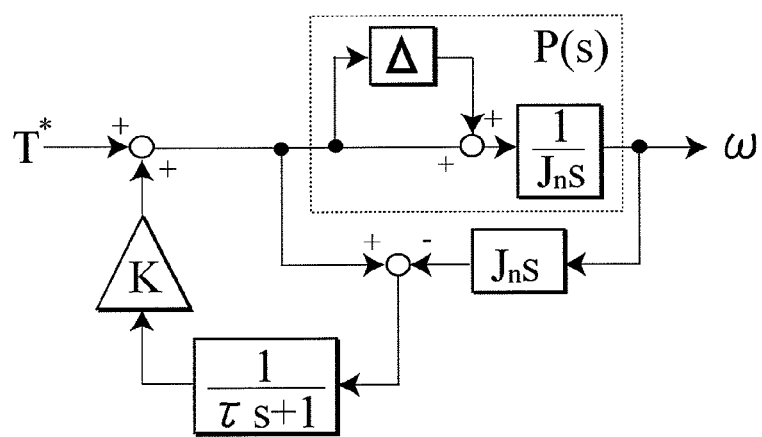

FIG. 12 is a block diagram of anti-slip control.

Figure 13A:
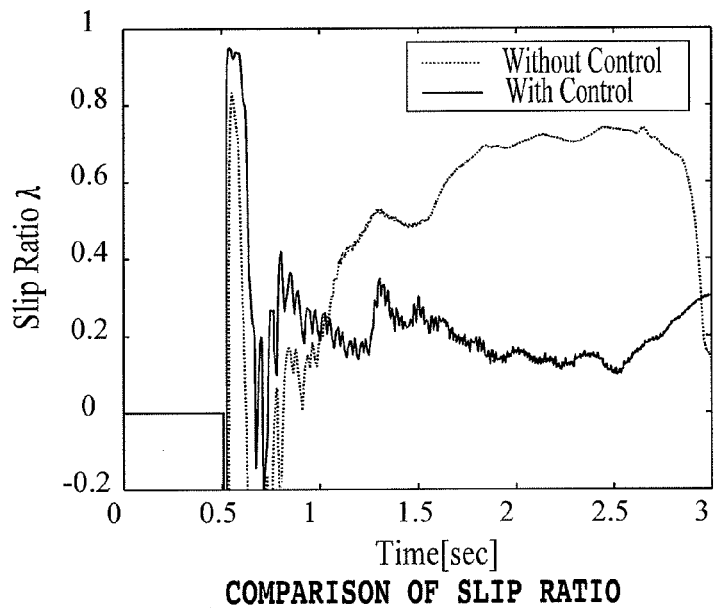

FIG. 13A is a diagram showing the slip ratio as results of experiments on the anti-slip control using the real vehicle.

Figure 13B:
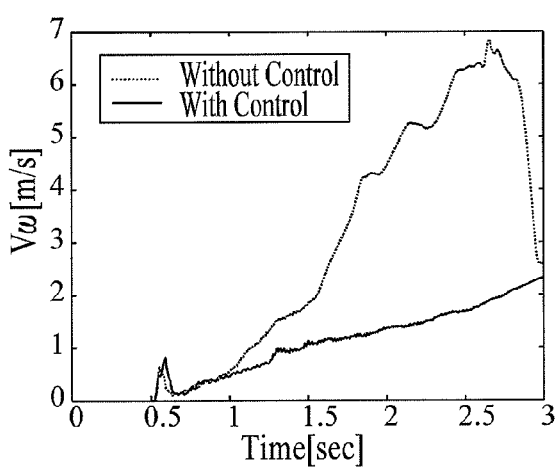

FIG. 13B is a diagram showing the wheel speed as results of experiments on the anti-slip control using the real vehicle.

Figure 13C:
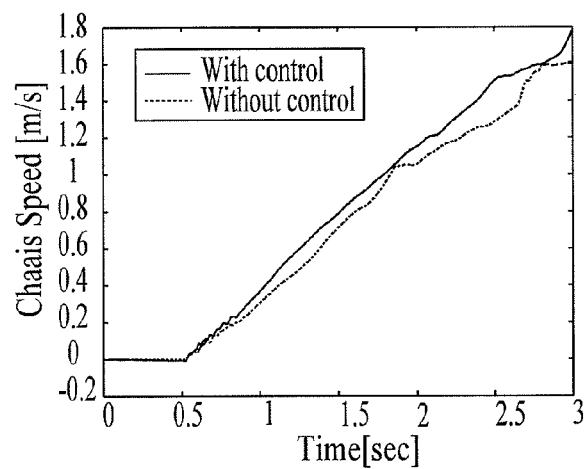

FIG. 13C is a diagram showing the body speed as results of experiments on the anti-slip control using the real vehicle.

Figure 14:
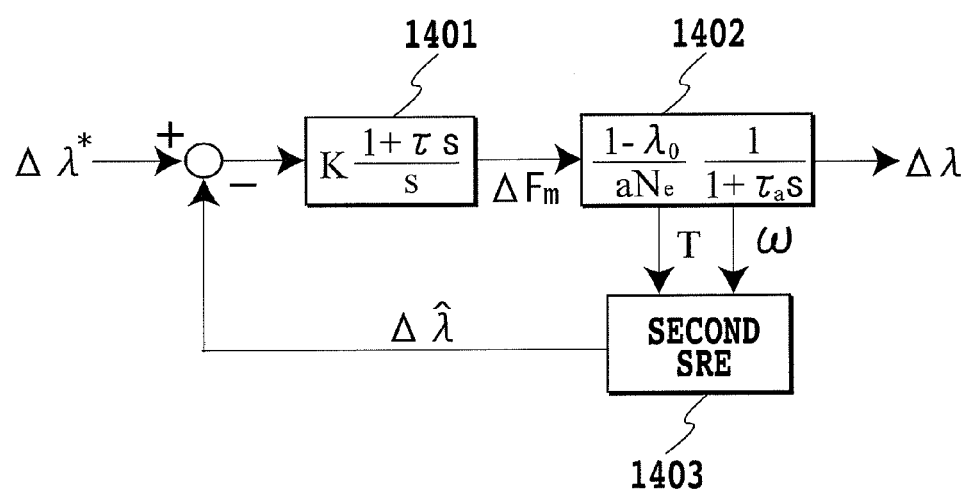

FIG. 14 is a block diagram of second slip ratio control.

Figure 15:
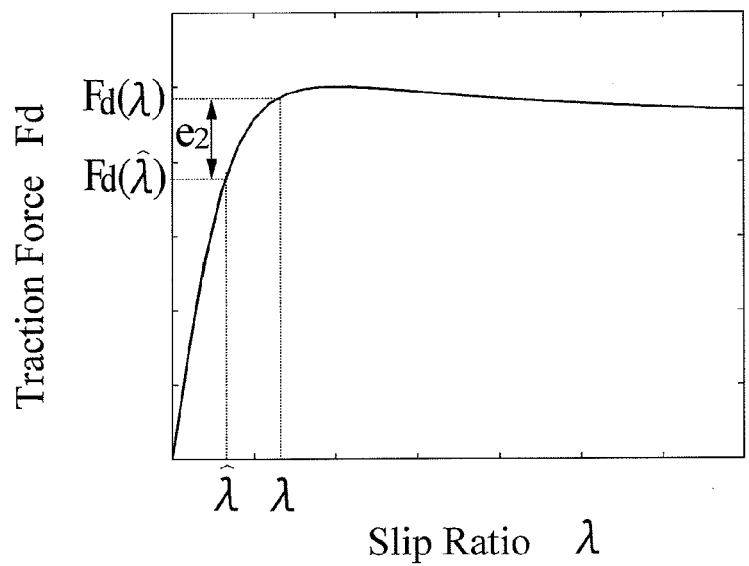

FIG. 15 is a diagram showing a relationship between a driving force and the slip ratio.

Figure 16:
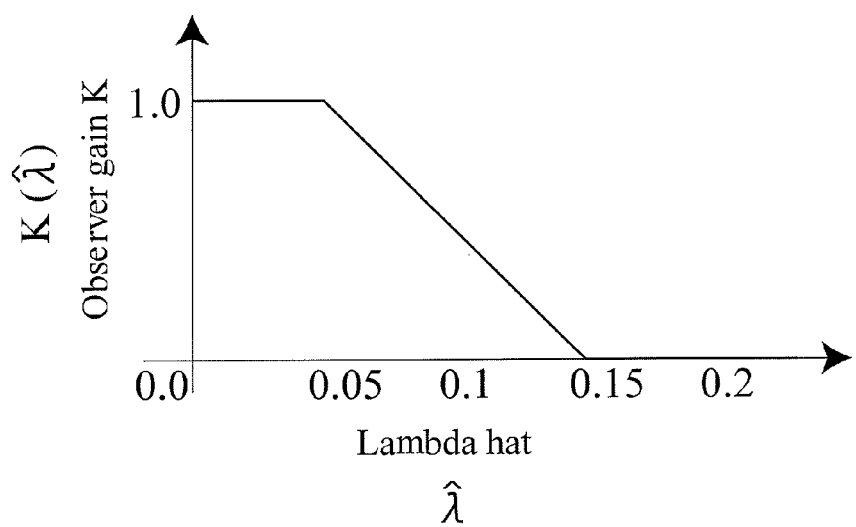

FIG. 16 is a diagram showing a relationship between an observer gain and an estimated value of the slip ratio.

Figure 17:
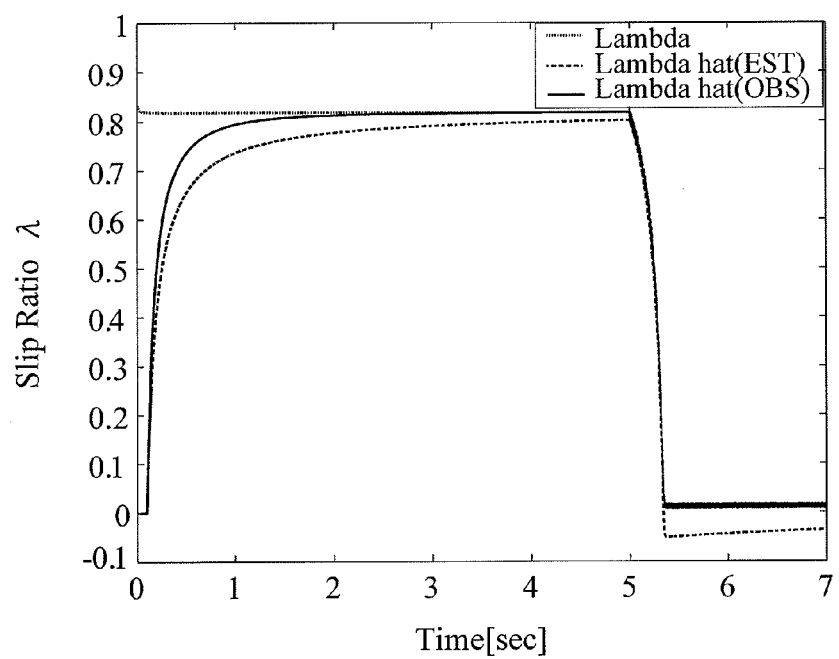

FIG. 17 is a diagram showing simulation results for estimation using first and second SREs.

Figure 18:
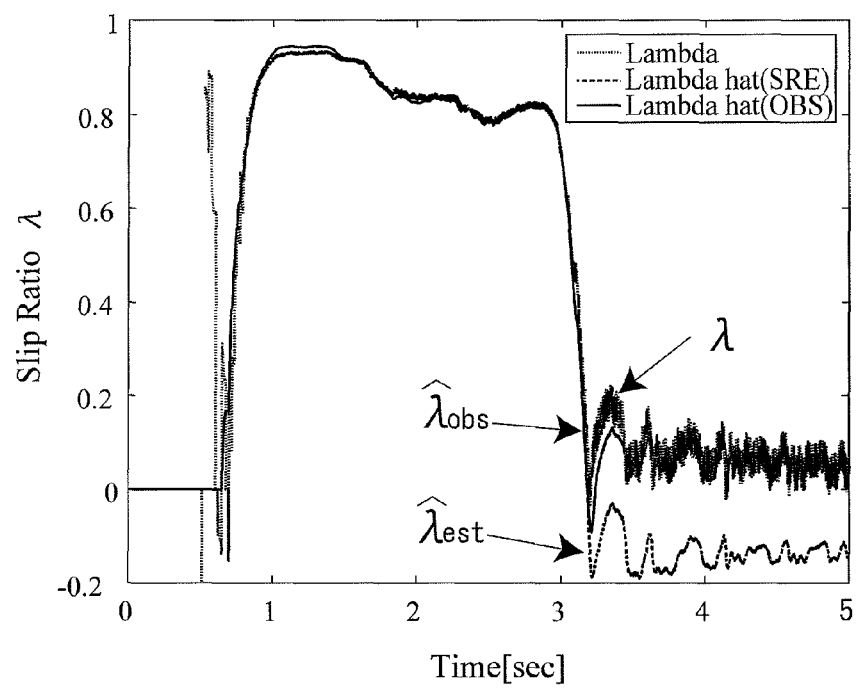

FIG. 18 is a diagram showing experimental results for the estimation using the first and second SREs.

Figure 19:
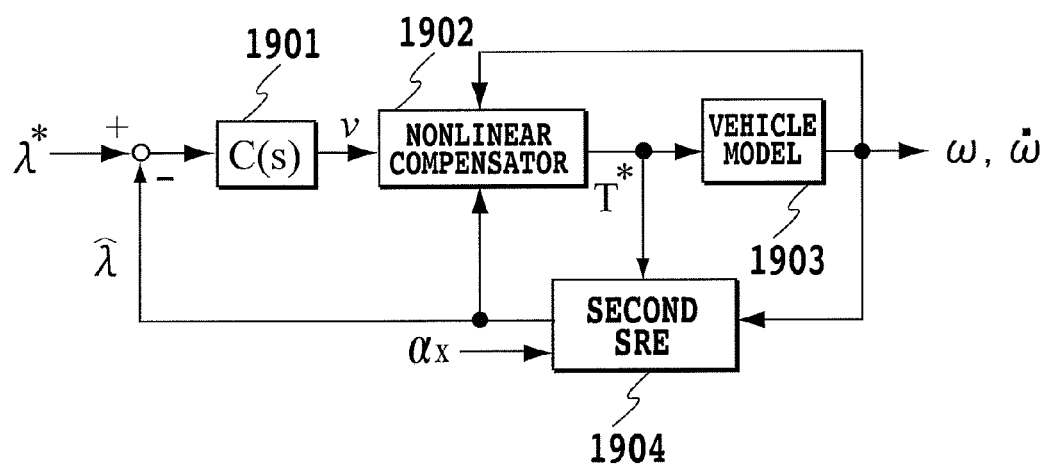

FIG. 19 is a block diagram of third slip ratio control.

Figure 20:
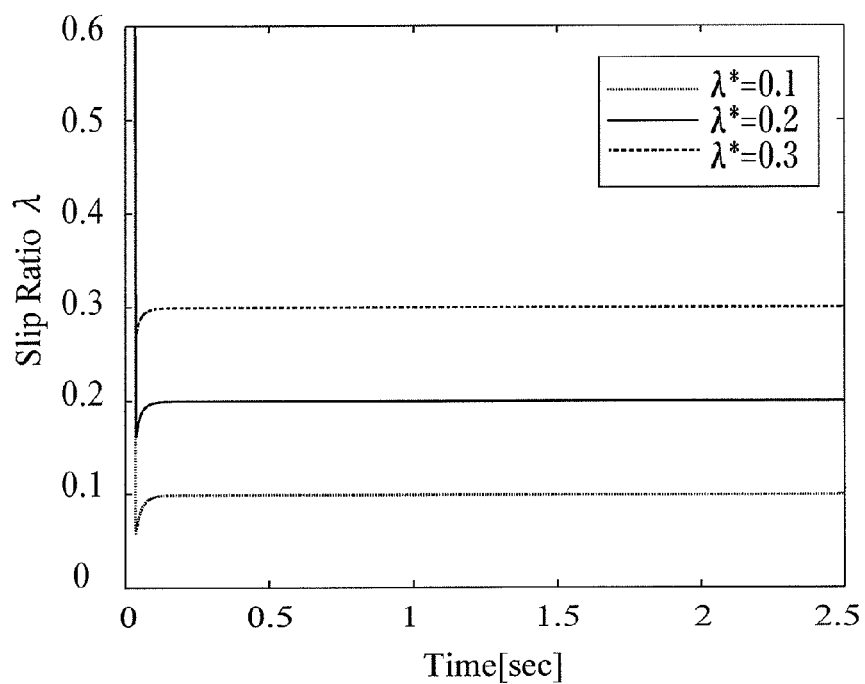

FIG. 20 is a diagram showing simulation results for the third slip ratio control.

Figure 21A:
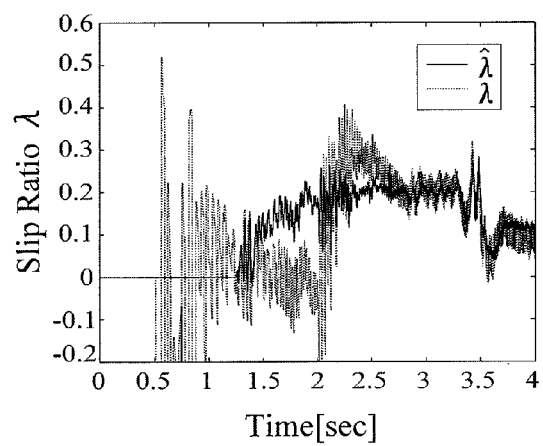

FIG. 21A is a diagram showing the slip ratio as results of experiments on a first slip ratio control device using the real vehicle.

Figure 21B:
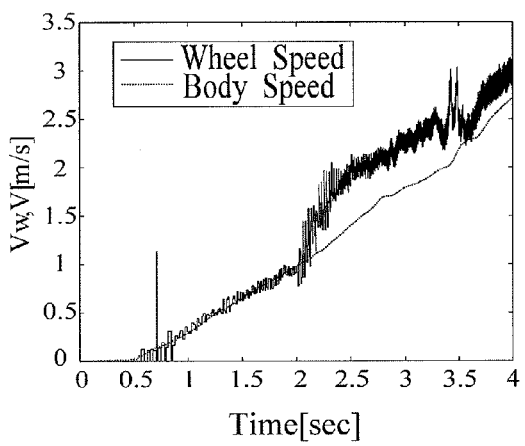

FIG. 21B is a diagram showing the wheel speed and body speed as results of experiments on the first slip ratio control device using the real vehicle.

Figure 22:
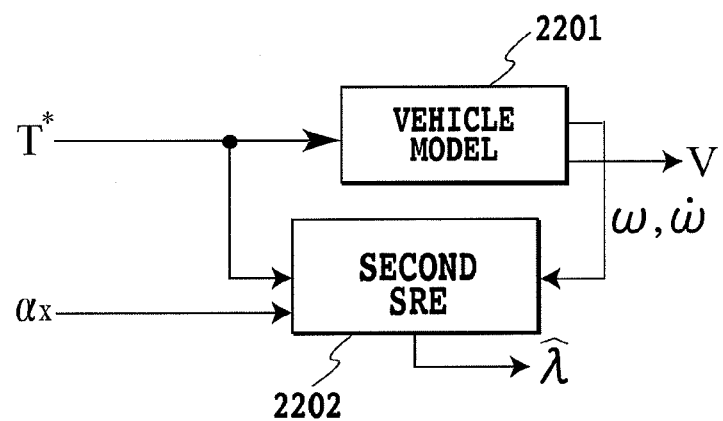

FIG. 22 is a block diagram of slip ratio estimation using a second slip ratio estimator according to Embodiment 2.

Figure 23:
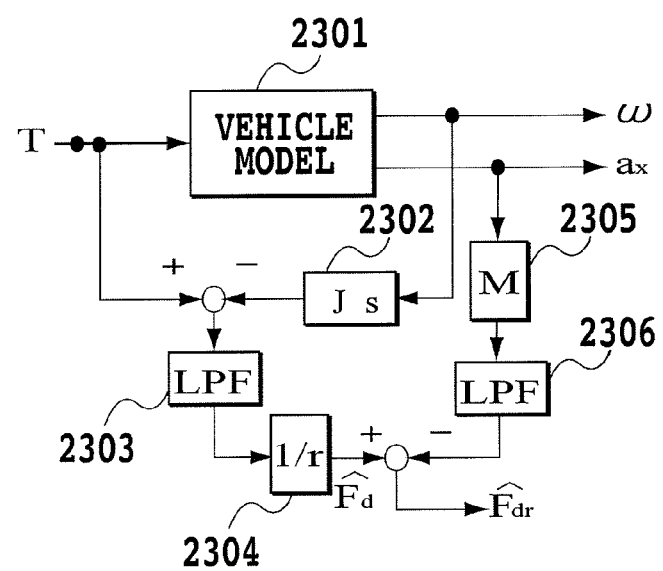

FIG. 23 is a block diagram of a driving resistance estimator.

Figure 24:
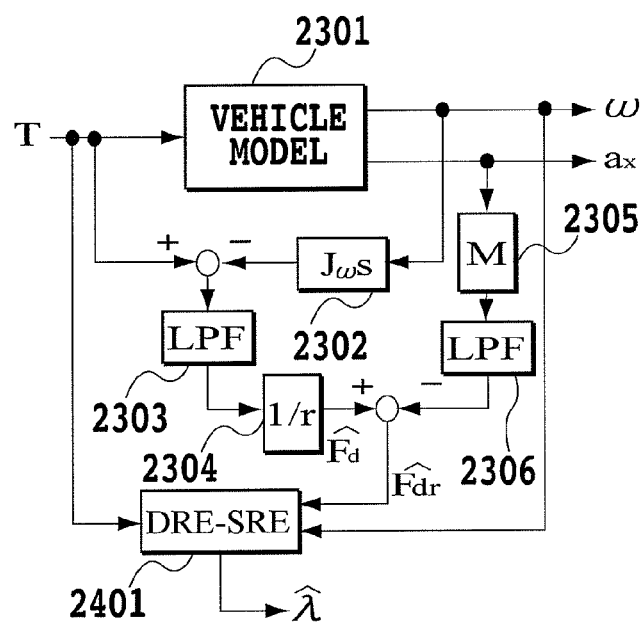

FIG. 24 is a block diagram of slip ratio estimation using a third slip ratio estimator.

Figure 25:
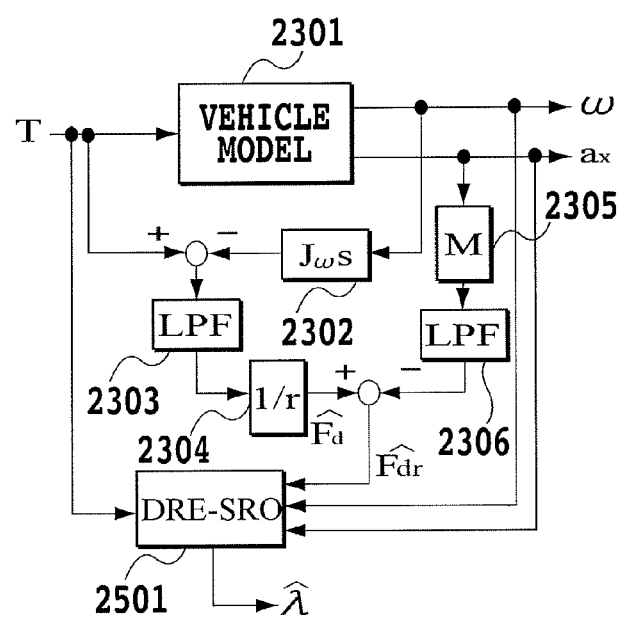

FIG. 25 is a block diagram of slip ratio estimation using a fourth slip ratio estimator.

Figures 26A, 26B, 26C:
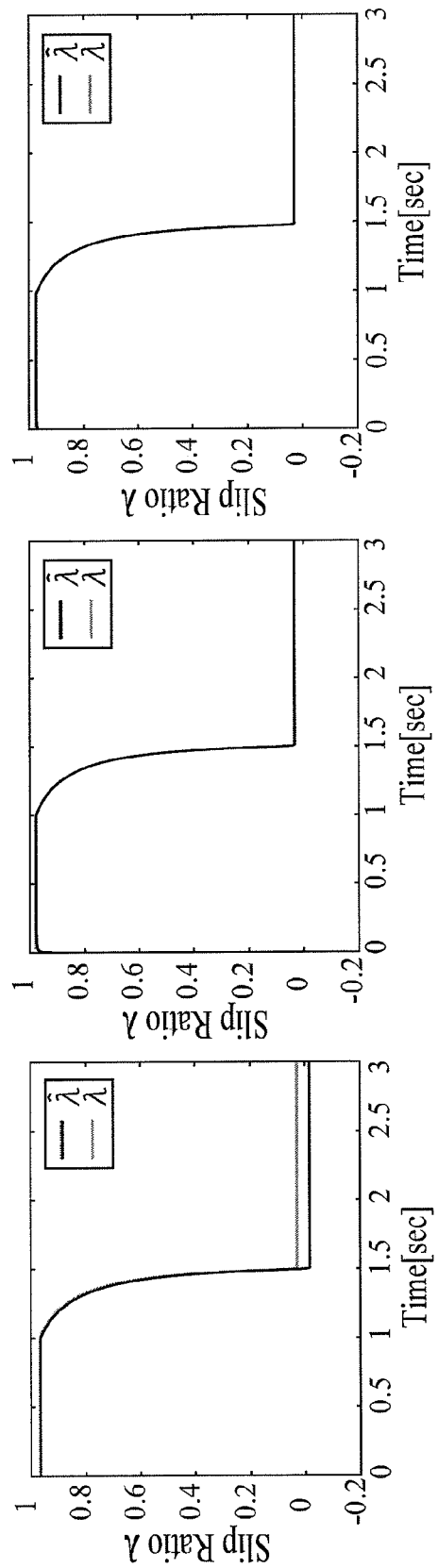

FIG. 26A is a diagram showing simulation results for slip ratio estimation using the first SRE.

FIG. 26B is a diagram showing simulation results for slip ratio estimation using a third SRE (DRE-SRE).

FIG. 26C is a diagram showing simulation results for slip ratio estimation using a fourth SRE (DRE-SRO).

Figure 27:
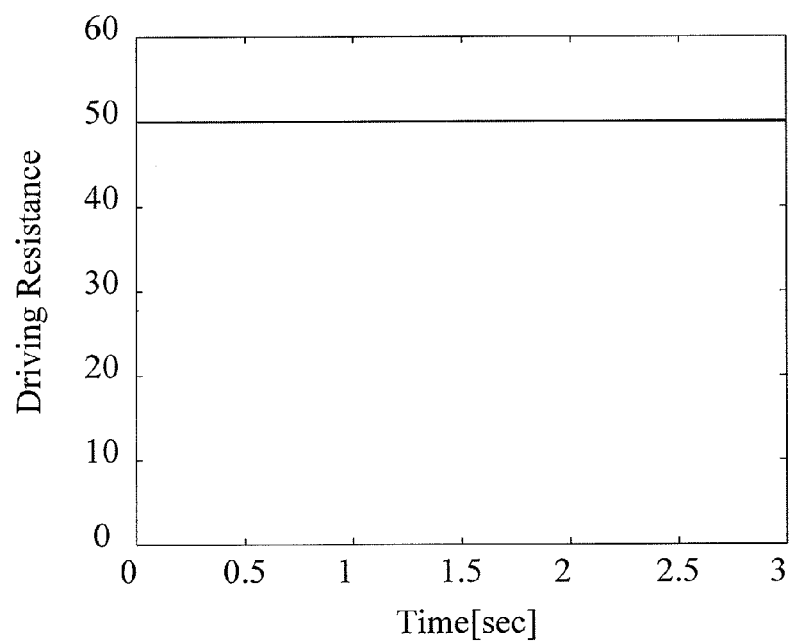

FIG. 27 is a diagram showing simulation results for driving resistance estimation results used for the DRE-SRE and DRE-SRO.

Figure 28:
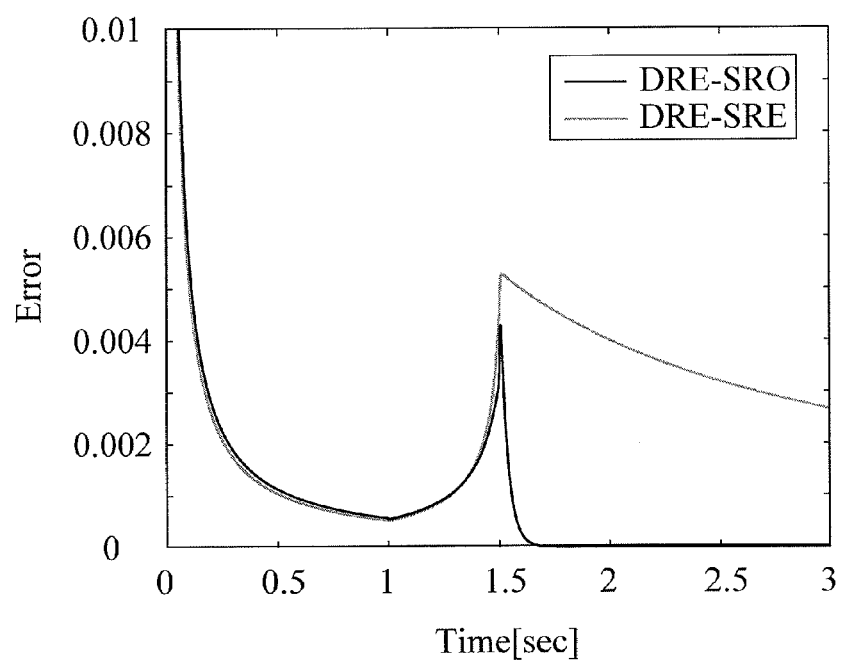

FIG. 28 is a diagram showing simulation results for estimation errors in the slip ratio estimation using the DRE-SRE and DRE-SRO.

Figures 29A, 29B, 29C:
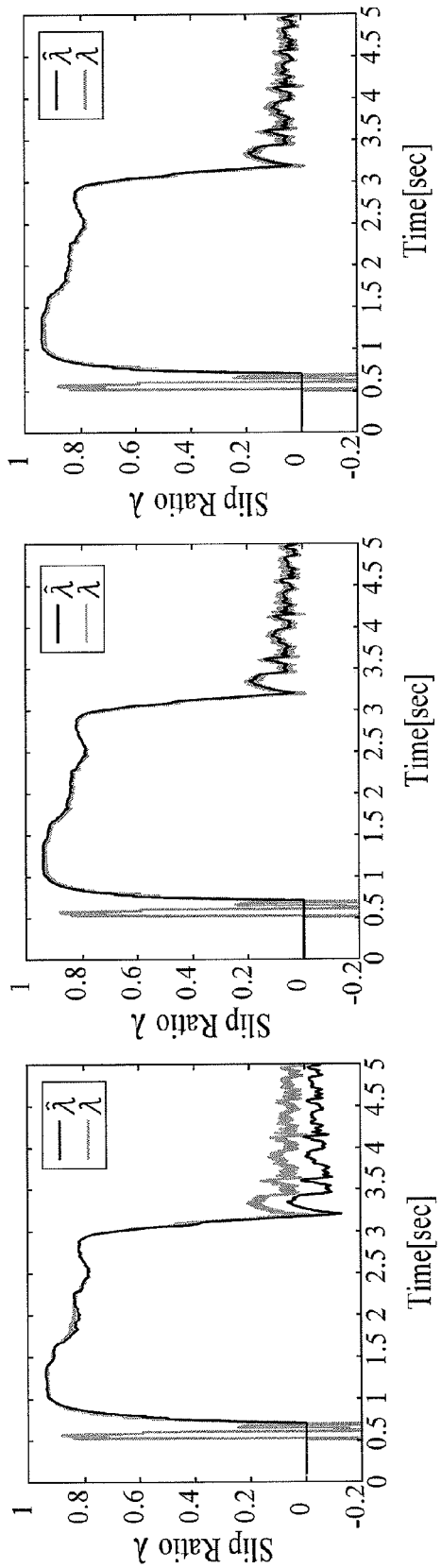

FIG. 29A is a diagram showing results of offline experiments on the slip ratio estimation using the first SRE.

FIG. 29B is a diagram showing results of offline experiments on the slip ratio estimation using the third SRE (DRE-SRE).

FIG. 29C is a diagram showing results of offline experiments on the slip ratio estimation using the fourth SRE (DRE-SRO).

Figure 30:
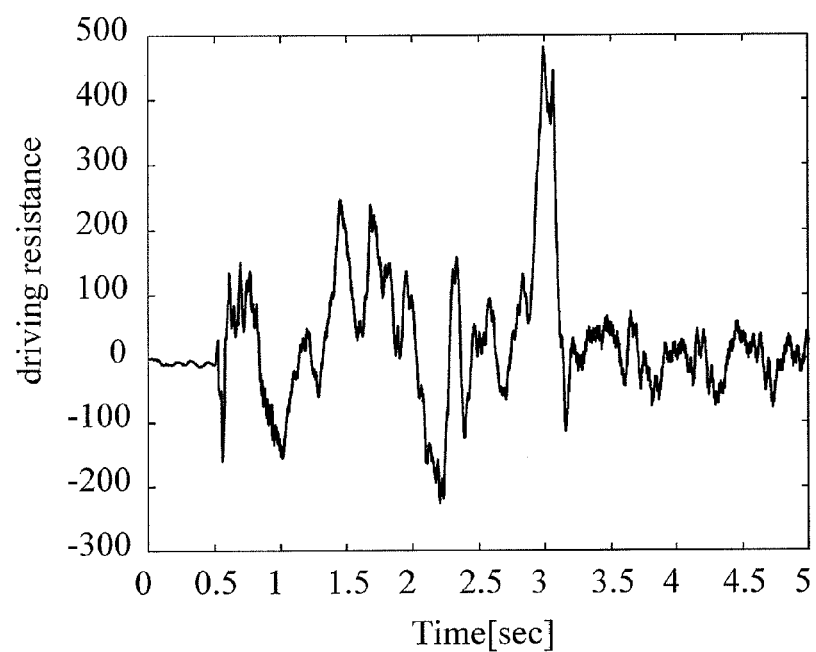

FIG. 30 is a diagram showing results of offline experiments on the driving resistance estimation results used for the DRE-SRE and DRE-SRO.

Figure 31:
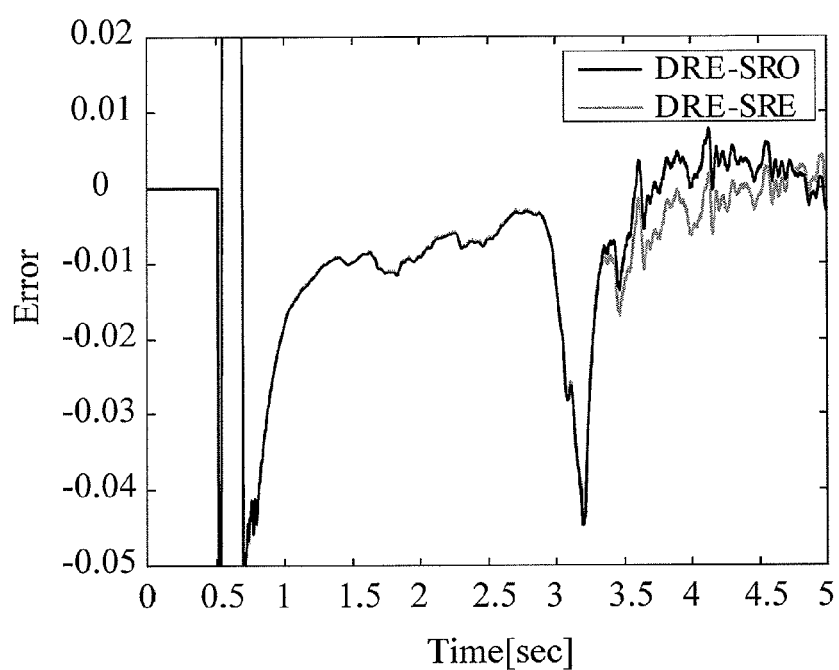

FIG. 31 is a diagram showing results of offline experiments on estimation errors in the slip ratio estimation using the DRE-SRE and DRE-SRO.

Figure 32:
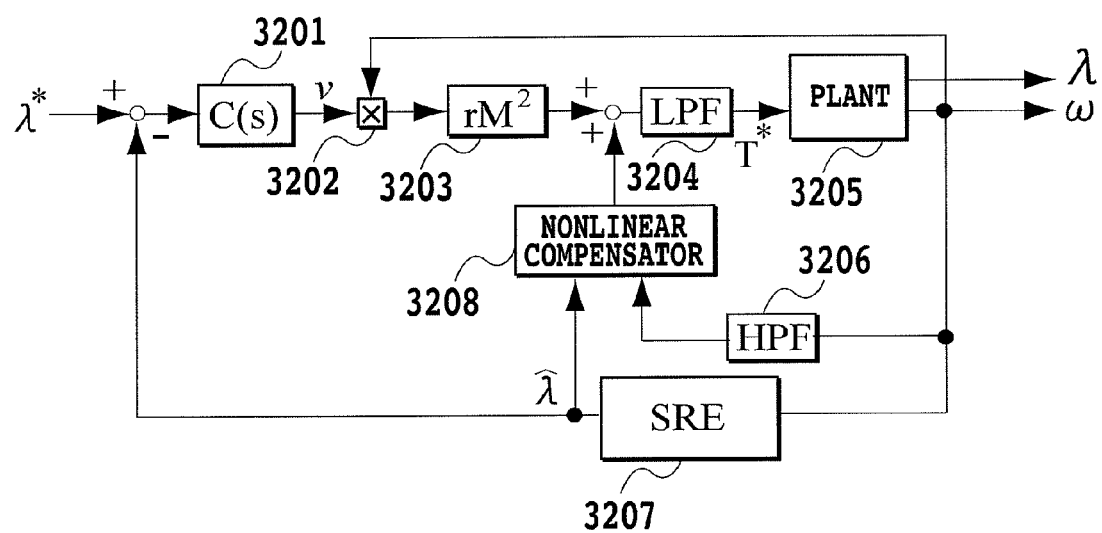

FIG. 32 is a block diagram of the slip ratio estimation using the DRE-SRE or DRE-SRO.

Figure 33:
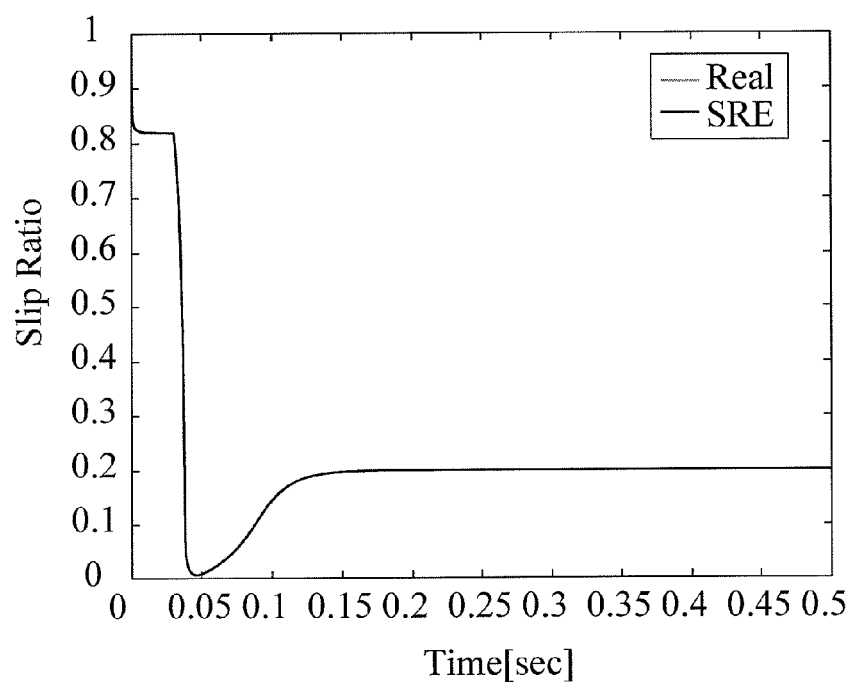

FIG. 33 a diagram showing simulation results for the slip ratio estimation using the DRE-SRE or DRE-SRO.

Figure 34:
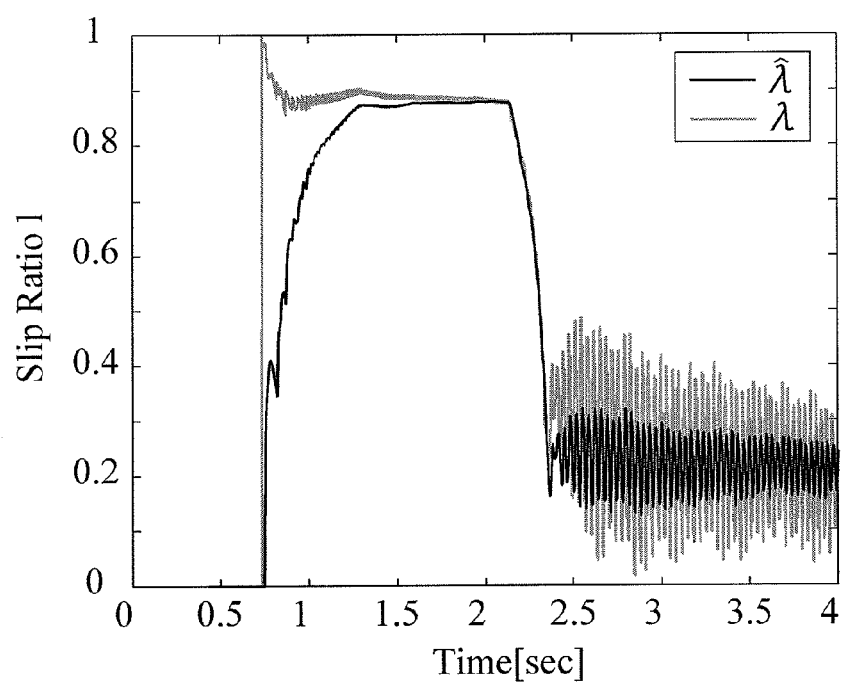

FIG. 34 a diagram showing results of experiments on the slip ratio estimation using the DRE-SRE or DRE-SRO, the experiments using the real vehicle.

Figure 35:
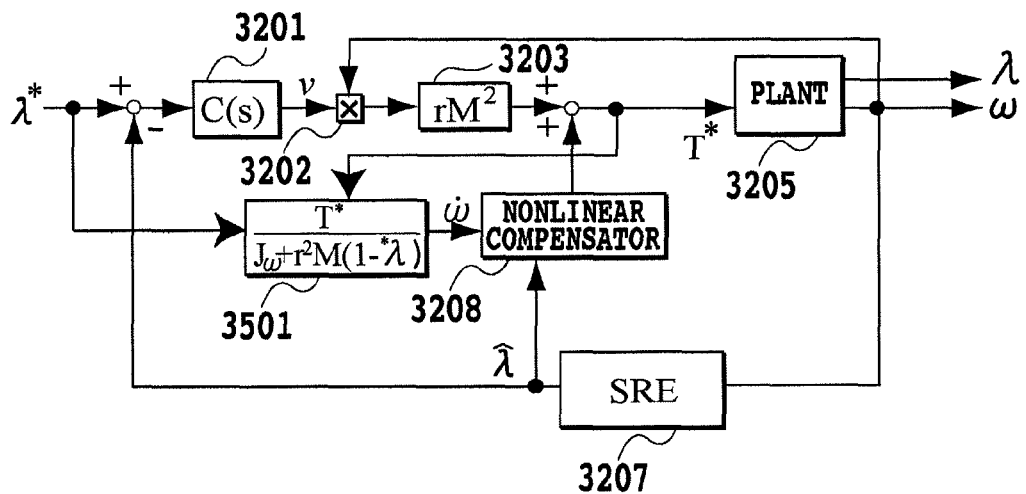

FIG. 35 is a block diagram of slip ratio control based on feed forward control.

Figure 36:
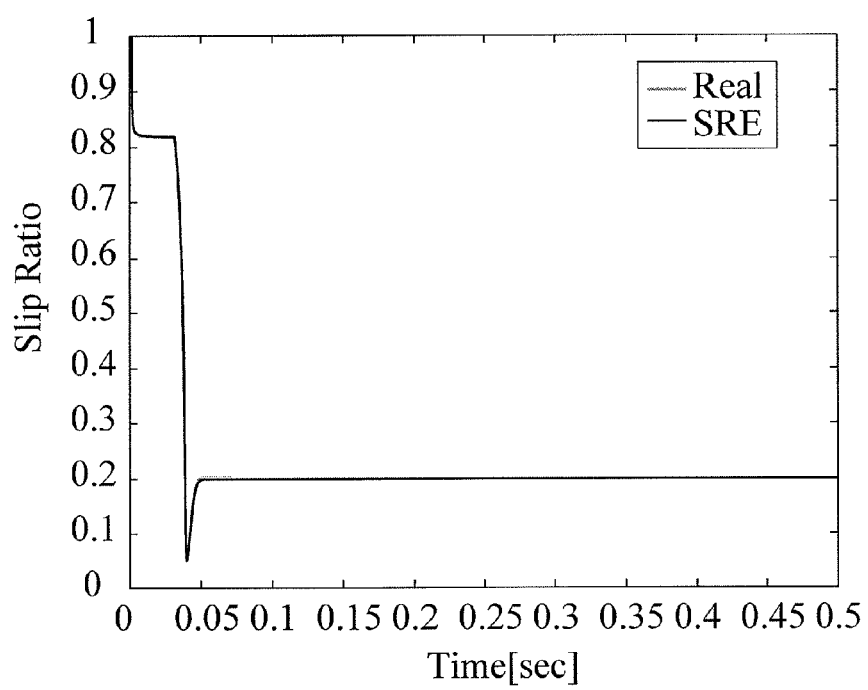

FIG. 36 is a diagram showing simulation results for the slip ratio control based on the feed forward control.

Figure 37:
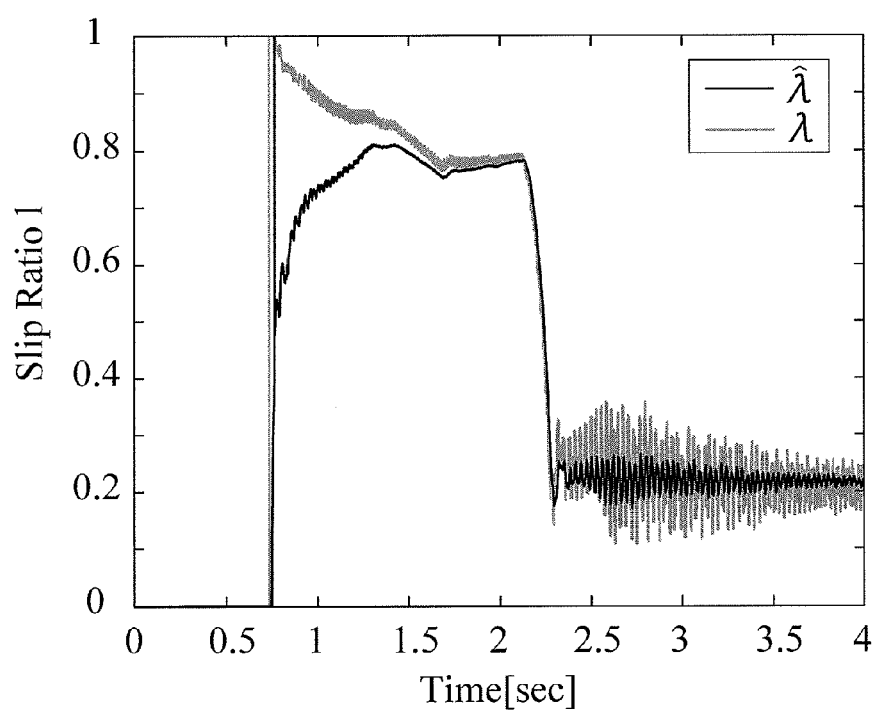

FIG. 37 a diagram showing results of experiments on the slip ratio control based on the feed forward control, the experiments using the real vehicle.

Figure 38:
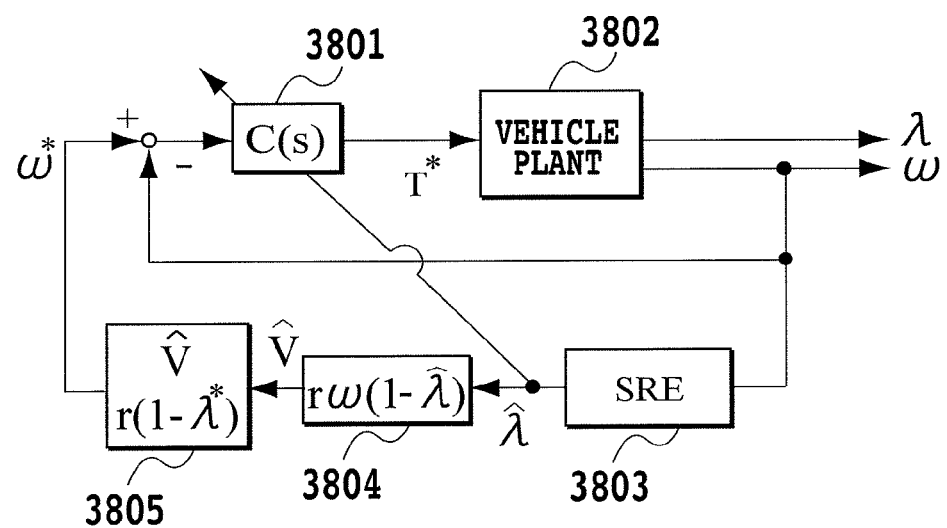

FIG. 38 is a block diagram of slip ratio control based on rotation control using a variable gain.

Figure 39:
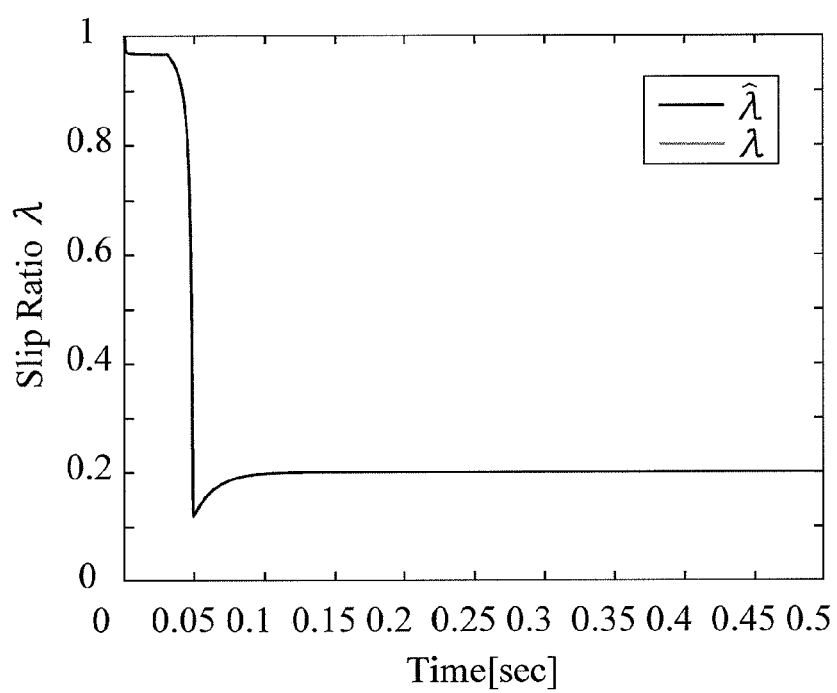

FIG. 39 is a diagram showing simulation results for the slip ratio control based on the rotation control using the variable gain.

Figure 40:
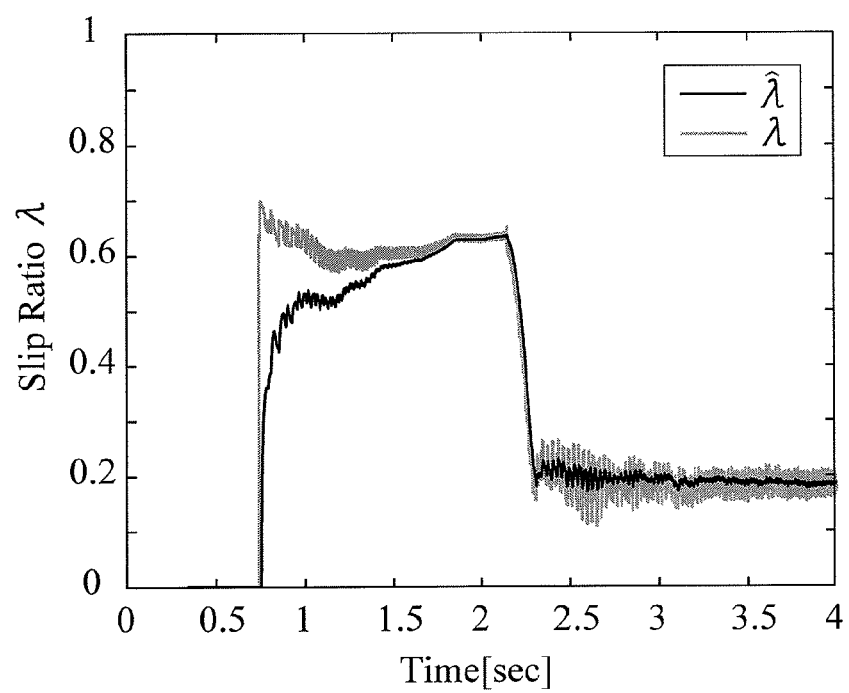

FIG. 40 is a diagram showing results of experiments on the slip ratio control based on the rotation control using the variable gain, the experiments using the real vehicle.

BEST MODE FOR CARRYING OUT THE INVENTION

Embodiments of the present invention will be described in detail with reference to the drawings.

An electric motor travels when a driving force of a motor connected to drive wheels is transmitted to the drive wheels. Current output by a power source is supplied to the motor via an inverter. The motor is electrically connected, via the inverter, to an electronic control unit (hereinafter referred to as an "ECU") serving as control means. An output from the motor is controlled by the inverter based on an instruction from the ECU. The ECU includes a CPU, a ROM, a RAM, an input/output port, and a storage device. Furthermore, the ECU connects electrically, via the inverter, to a torque measuring instrument that measures a torque generated by the motor, a position sensor installed on the motor, and an acceleration sensor that measures an acceleration generated in a body.

Now, a slip ratio control device mounted in the ECU will be described.

Embodiment 1

1.1 Equation of Motion for the Body

Figure 1:
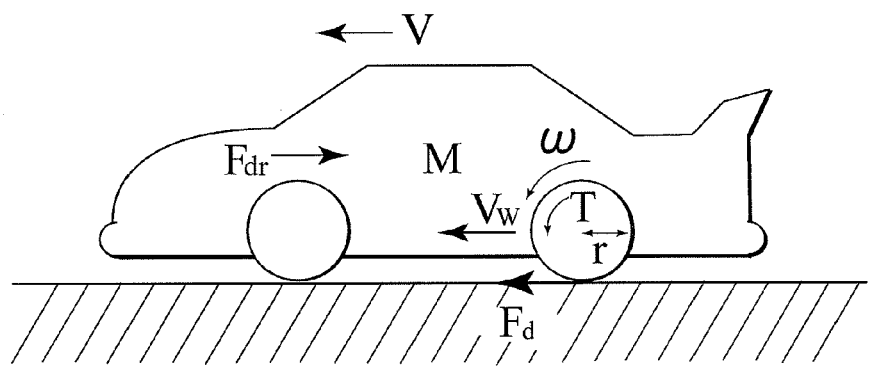
FIG. 1 is a schematic diagram showing forces exerted on a vehicle.

First, parameters dominating the motion of the vehicle will be considered. FIG. 1 shows forces acting on the vehicle. In this case, it is assumed that the motor has a very small time constant and that driving resistance is very small. In this case, an equation of motion for the vehicle is expressed by:

[Formula 31]

$$J_\omega \dot\omega = T - rF_d \quad (1)$$

[Formula 32]

$$M\dot V = F_d - F_{dr} \quad (2)$$

[Formula 33]

$$V_w = r\omega \quad (3)$$

Variables in these formulae are the rotation speed ω of the wheels, a body speed V, a wheel speed $V_\omega$, a motor torque T, a driving force $F_d$, and driving resistance $F_{dr}$. Constants in the above-described formulae are body weight M, a tire radius r, an inertia moment Jω of a wheel rotating portion. Reference character s denotes differentiation.

Furthermore, as a function of V and $V_\omega$, a slip ratio λ can be expressed by:

[Formula 34]

$$\lambda = \frac{V_w - V}{\max(V_w, V, \epsilon)}. \quad (4)$$

However, during driving, max $(V_\omega, V) = V_\omega$, and during braking, max $(V_\omega, V) = V$. Furthermore, selection is made such that $\epsilon \ll 1$. The present application assumes only the driving period. Thus, max $(V_\omega, V) = V_\omega$ always holds true. In connection with a relationship between the slip ratio λ and a friction coefficient μ, Magic Formula (see Non-Patent Document 3) is adopted as a typical model for simulation or the like.

[Formula 35]

$$\mu(\lambda) = D\sin\left(C\tan^{-1}B(1-E)\lambda + \frac{E}{B}\tan^{-1}B\lambda\right) \quad (5)$$

Figure 2:
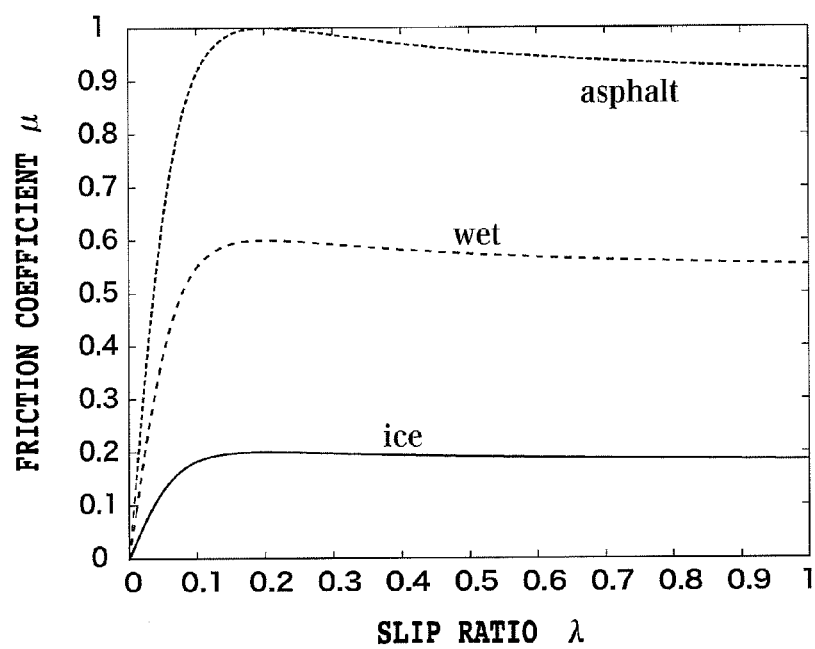
FIG. 2 is a diagram showing typical $\mu$-$\lambda$ curves for the conditions of a dry asphalt surface, a wet road surface, and an iced road surface.

Here, B, C, D, and E denote predetermined constants. FIG. 2 shows typical μ-λ curves for the conditions of a dry asphalt surface, a wet road surface, and an iced road surface. In an area in which a tire contacts the road surface, a sticking area and a sliding area are mixed when the slip ratio λ exhibits a value smaller than that exhibited when the friction coefficient μ has a peak value. When the slip ratio λ exhibits different values, only the sliding area is present, and the contact area is in a full sliding condition. That is, the vehicle can be accelerated without being slipped, by performing control such that the slip ratio λ exhibits a value smaller than that exhibited when the friction coefficient μ has the peak value. The slip ratio obtained when the friction coefficient μ exhibits the peak value is called the optimum slip ratio and is generally 0.05 to 0.2.

A frictional force $F_d$ between the road surface and the tire is obtained by multiplying the friction coefficient μ with vertical resistance N.

[Formula 36]

$$F_d = \mu N \quad (6)$$

Figure 3:
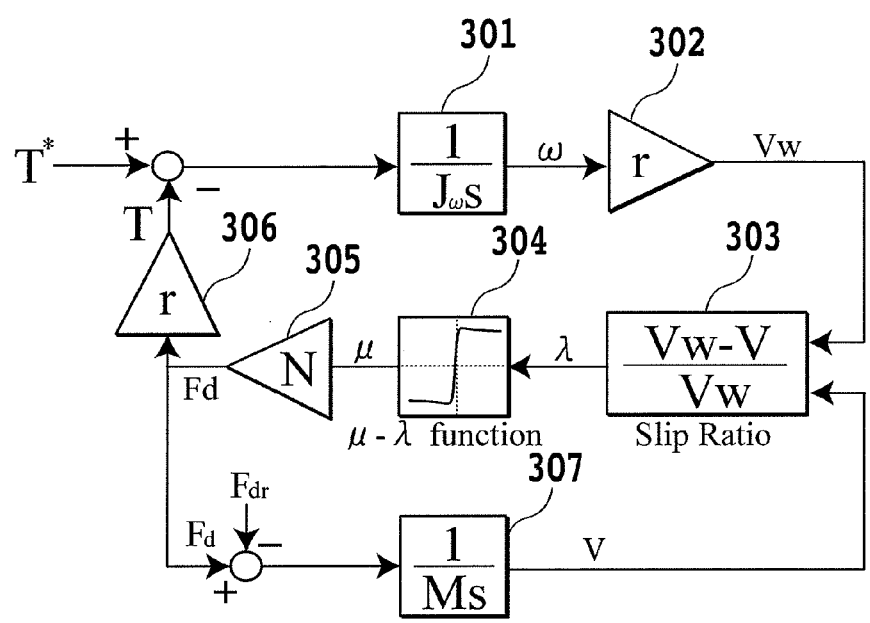
FIG. 3 is a block diagram of a vehicle model.

FIG. 3 shows a block diagram of a vehicle model. FIG. 3 indicates Formulae (1) to (6) associated with one another; the figure indicates a series of processes for deriving the slip ratio λ from a measured value T* for the motor torque and the constants. The motor torque T* measured by the torque measuring instrument is output to block 301. Block 301 derives the rotation speed ω of the wheels based on Formula (1) and output the result to block 302. Block 302 derives the wheel speed $V_\omega$ based on Formula (3) and output the result to block 303. Block 303 derives the slip ratio λ based on Formula (4) and output the result to block 304. Block 304 derives the friction coefficient μ based on Formula (5) and output the result to block 305. Block 305 derives the driving force $F_d$ based on Formula (6) and output the result to blocks 306 and 307. Block 306 multiplies the driving force $F_d$ by the tire radius r to calculate the second item of the right side of Formula (1). Block 306 then outputs the result to block 301. Block 307 derives the body speed V based on Formula (2) and outputs the result to block 303.

Here, Formulae (1) to (4) are used to erase $V_\omega$, V, and $F_d$, and it is assumed that the driving resistance to a negligibly small value ($F_{dr} \approx 0$). Then, the following formula can be obtained.

[Formula 37]

$$\dot\omega = \frac{T + r^2 M\omega\lambda}{J_\omega + r^2 M(1-\lambda)} \equiv \frac{T + r^2 M\omega\lambda}{J} \quad (7)$$

J denotes the real inertia moment of a rotating portion including the wheels and the body, and corresponds to a value obtained by adding the body inertia moment, in axial equivalent, of the second term in parentheses in a denominator of Formula (7) to the inertia moment $J_\omega$ of the wheel rotating portion.

1.2 First Slip Ratio Estimator

A slip ratio estimator (SRE) according to the present invention performs estimation taking the second item in a numerator of the right side of Formula (7). Formula (7) can be rewritten into:

[Formula 38]

$$\dot\lambda = -\frac{\dot\omega}{\omega}\lambda + \left(1 + \frac{J_\omega}{r^2 M}\right)\frac{\dot\omega}{\omega} - \frac{T}{r^2 M\omega}. \quad (8)$$

The SRE according to the present invention performs estimation based on Formula (8). An estimated value of the slip ratio determined by the present SRE is defined as:

$$\hat\lambda. \quad \text{[Formula 39]}$$

[Formula 40]

$$\dot{\hat\lambda} = -\frac{\dot\omega}{\omega}\hat\lambda + \left(1 + \frac{J_\omega}{r^2 M}\right)\frac{\dot\omega}{\omega} - \frac{T}{r^2 M\omega} \quad (9)$$

Figure 4:
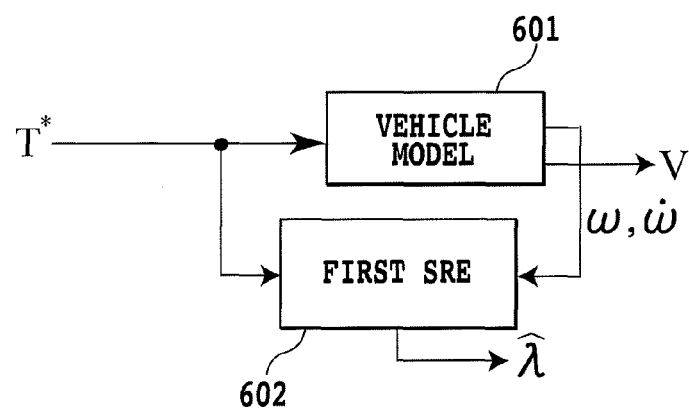
FIG. 4 is a block diagram of slip ratio estimation using an estimator according to Embodiment 1.

FIG. 4 shows a block diagram of slip ratio estimation using the first estimator according to Embodiment 1. The motor torque T* measured by the torque measuring instrument is input to each of the above-described vehicle model 601 and a first SRE 602 based on Formula (9). The vehicle model 601 derives the wheel rotation speed ω, the wheel rotation acceleration:

$$\dot\omega, \quad \text{[Formula 41]}$$

and the body speed V, and outputs the wheel rotation speed ω and the wheel rotation acceleration:

$$\dot{\omega} \quad \text{[Formula 42]}$$

to the first SRE 602. Based on the motor torque T*, the wheel rotation speed ω, and the wheel rotation acceleration:

$$\dot{\omega}, \quad \text{[Formula 43]}$$

the first SRE 602 outputs the slip ratio:

$$\hat{\lambda}. \quad \text{[Formula 44]}$$

Here, to evaluate an error between a true value λ for the slip ratio and an estimated value therefor:

$$\hat{\lambda}, \quad \text{[Formula 45]}$$

an estimation error e (t) defined as follows will be considered.

[Formula 46]

$$e(t) = \lambda - \hat{\lambda} \quad (10)$$

Formula (9) is subtracted from Formula (8) to obtain:

[Formula 47]

$$\frac{d}{dt}e(t) = -\frac{\dot{\omega}}{\omega}e(t) \quad (11)$$

The formula indicates that if:

$$\frac{\dot{\omega}}{\omega} > 0, \quad \text{[Formula 48]}$$

the estimation error e(t) converges to zero as the time elapses. For example, in the present embodiment, for ω>0, which is mostly assumed during driving (ω≠0), if:

$$\dot{\omega} < 0, \quad \text{[Formula 49]}$$

then $$\frac{\dot{\omega}}{\omega} < 0, \quad \text{[Formula 50]}$$

and the estimation error expands. Thus, accurate estimation can be achieved by operating the SRE only when:

$$\dot{\omega} > 0. \quad \text{[Formula 51]}$$

However, if a model error is small and the estimation error e(t) has converged to zero once and thus has a very small value, then even in an unstable condition in which:

$$\frac{\dot{\omega}}{\omega} < 0, \quad \text{[Formula 52]}$$

the estimation error e(t) converges slowly to zero. Thus, the first SRE always perform estimation based on Formula (9).

1.3 Slip Rate Control Using the First SRE

A method of measuring the body speed to control the slip ratio has been proposed. As described above, measurement of the body speed is difficult. Thus, in first slip control according to the present embodiment, the first SRE is used to estimate the slip ratio λ to allow the slip ratio to be controlled.

A transfer function from the motor torque T to the slip ratio λ is determined. It is assumed that the drive wheels are always driven, Formula (4) is totally differentiated and linearized to obtain:

[Formula 53]

$$\Delta\lambda = -\frac{1}{V_{\omega 0}}\Delta V + \frac{V_0}{V_{\omega 0}^2}\Delta V_{\omega} \quad (12)$$

where $V_{\omega 0}$ and $V_0$ denote operation points for the wheel speed and the body speed, respectively. For a frictional force, the inclination of the vicinity of the slip ratio λ corresponding to the operation point is defined as a. Then, the following formula holds true.

[Formula 54]

$$\Delta\mu = a\Delta\lambda \quad (13)$$

Based on Formulae (12) and (13) resulting from the linearization and Formulae (1), (2), and (6), a transfer function from $\Delta F_m$ to $\Delta\lambda$ is:

[Formula 55]

$$\frac{\Delta\lambda}{\Delta F_m} = \frac{1-\lambda_0}{aN_e}\frac{1}{1+\tau_a s}. \quad (14)$$

However, the following formulae hold true.

[Formula 56]

$$\tau_a = \frac{J_n V\omega 0}{aN_e} \quad (15)$$

[Formula 57]

$$\frac{1}{N_e} = \frac{1}{N}\frac{M}{J_n + M(1-\lambda_0)} \quad (16)$$

Figure 5:
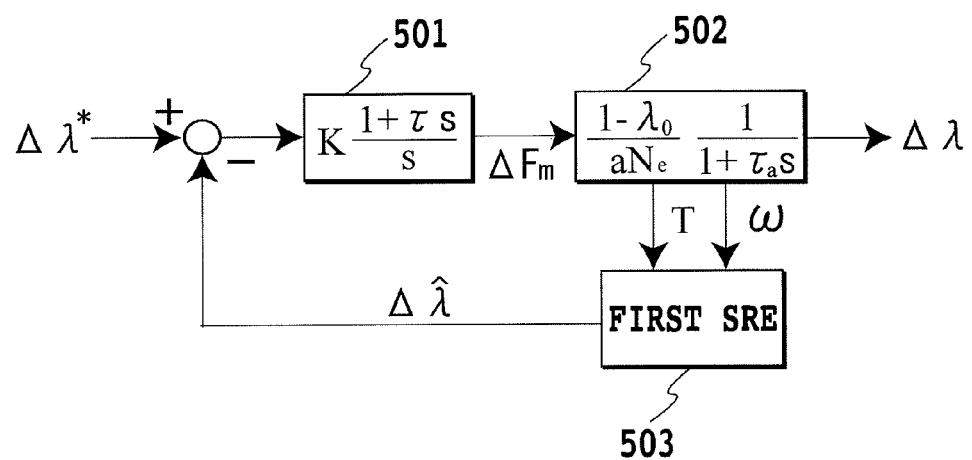
FIG. 5 is a block diagram of first slip ratio control according to Embodiment 1.

Thus, the transfer function is of a 1st-order lag type involving a time constant proportional to a wheel side. FIG. 5 shows a block diagram of the first slip ratio control according to Embodiment 1. Δλ* denotes a target slip ratio to which the slip ratio λ can be allowed to converge by controlling the real wheel rotation speed to the value of ω output from block 1202. The target slip ratio Δλ* is input to block 501. Block 501 corresponds to an integral controller that derives the motor torque $\Delta F_m$ and inputs the result to block 502. Block 502 derives the motor torque T and the rotation speed ω of the wheels and inputs the results to a first SRE 503. Based on Formula (9), the first SRE 503 derives the slip ratio:

$$\Delta\hat{\lambda}, \quad \text{[Formula 58]}$$

and outputs the result to an adder-subtractor. The adder-subtractor subtracts:

$$\Delta\hat{\lambda} \quad \text{[Formula 59]}$$

from Δλ* and inputs the resultant value to block 501.

Figure 6A:
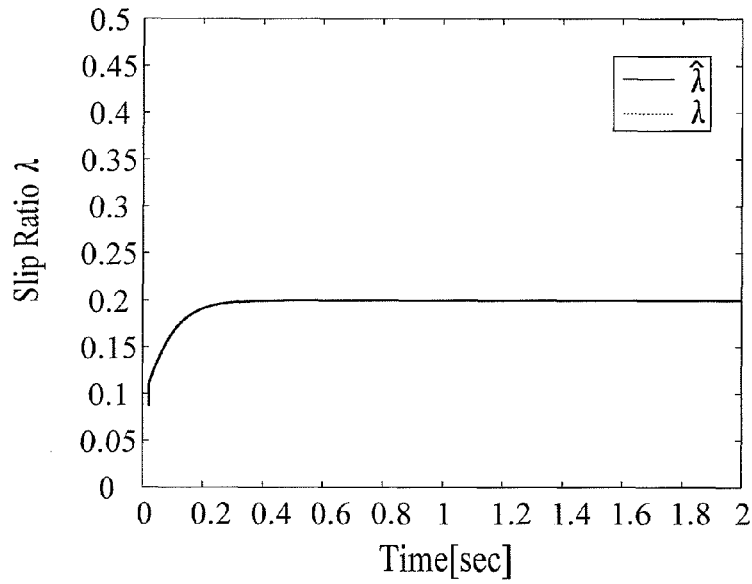
FIG. 6A is a diagram showing simulation results for a slip ratio.
Figure 6B:
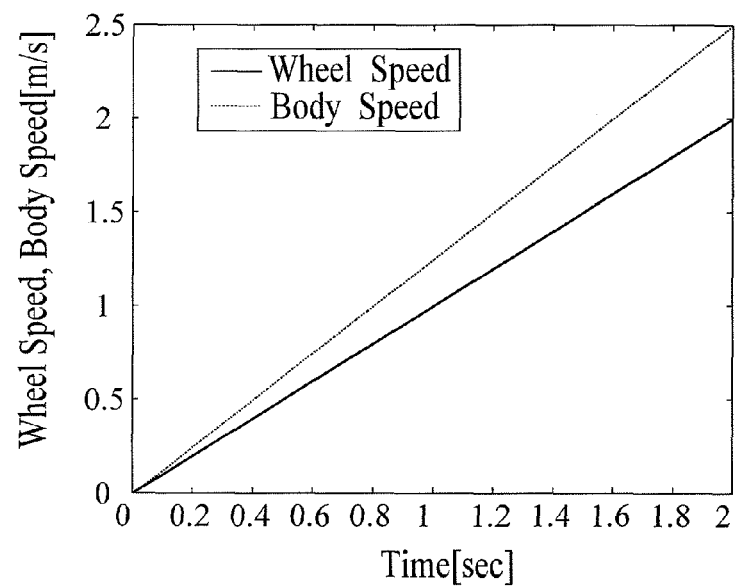
FIG. 6B is a diagram showing simulation results for a wheel speed.

FIGS. 6A and 6B show the results of simulation in which the vehicle traveled on a road with a small μ value ($\mu_{max}$=0.2)

and in which the target slip ratio was 0.2. FIGS. 6A and 6B show that the slip ratio was successfully controlled to 0.2, which is the target slip ratio.

1.4 Other SREs

Now, besides the SRE according to the present invention, SREs using a sequential least squares method and a disturbance observer, that is, conventional SREs, will be described for comparison.

1.4.1 Estimation Based on the Sequential Least Squares Method

The second item in the numerator of the right side of Formula (7) appears only when the slip ratio $\lambda$ varies temporally, and has a value of zero in a steady state. Thus, an item for time differentiation of the slip ratio:

$$\dot{\lambda} \quad \text{[Formula 60]}$$

is set to zero to obtain:

[Formula 61]

$$\frac{\omega}{T} = \frac{1}{(J_\omega + r^2 M(1-\lambda))s} \equiv \frac{1}{Js}. \quad (17)$$

In Formula (17), the wheel speed $\omega$ and the motor torque T can be measured, $J_\omega$, r, and M are all constants, and the items other than $\lambda$ are known. Thus, the sequential least squares method is used to determine the inertia moment J, based on which the slip ratio $\lambda$ is estimated.

An estimation algorithm is shown below. The right side of Formula (17) includes a differential item. Thus, a low pass filter is applied to both sides of the formula.

[Formula 62]

$$\frac{s}{\tau s+1}\omega = \frac{1}{(J_\omega + r^2 M(1-\lambda))}\frac{1}{\tau s+1}T \quad (18)$$

In Formula (18), the left side is changed to y(k), the first item on the right side is changed to $\theta$(k), and the second item on the right side is changed to $\xi$(k). The inertia moment J is determined based on the following algorithm of the sequential least square method. Based on Formula (21), the slip ratio:

$$\hat{\lambda} \quad \text{[Formula 63]}$$

is derived. $\kappa$ is a forgetting coefficient.

[Formula 64]

$$\hat{\theta}(k) = \hat{\theta}(k-1) - \frac{\Gamma(k-1)\xi(k)}{\kappa + \xi^2(k)\Gamma(k-1)}\left[\xi(k)\hat{\theta}(k-1) - y(k)\right] \quad (19)$$

[Formula 65]

$$\Gamma(k) = \frac{1}{\kappa}\left[\Gamma(k-1) - \frac{\Gamma^2(k-1)\xi^2(k)}{\kappa + \Gamma(k-1)\xi(k)^2}\right] \quad (20)$$

[Formula 66]

$$\hat{\lambda} = -\frac{\hat{J} - J_\omega}{r^2 M} + 1 \quad (21)$$

Figure 7:
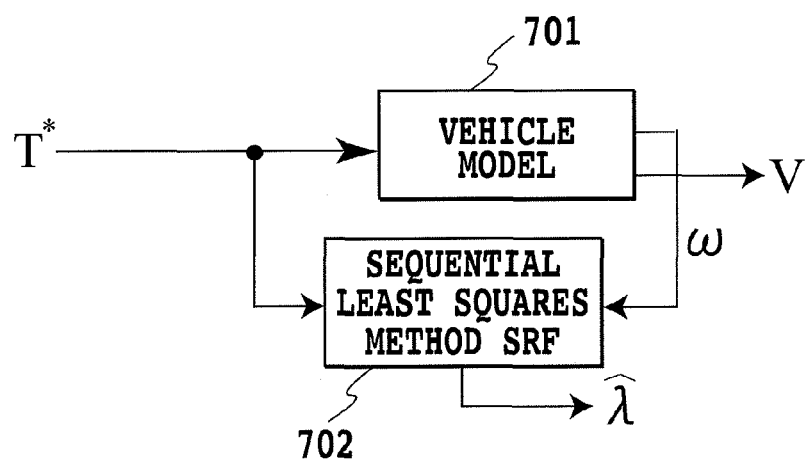
FIG. 7 is a block diagram of slip ratio estimation based on a sequential least squares method.

FIG. 7 shows a block diagram of the slip ratio estimation based on the sequential least squares method. This process is a combination of the processing of the vehicle model 701 with the SRE 702 using the sequential least squares method in Formulae (19) to (21).

1.4.2 Estimation Based on the Disturbance Observer

Estimation is performed using Formula (17) in which temporal variation in slip ratio $\lambda$ is zero. When a wheel idle-rotation phenomenon occurs, the slip ratio $\lambda$ increases to sharply reduce the value of the inertia moment J. This variation in inertia moment value is considered to be a disturbance. The disturbance is utilized as an observer to estimate the slip ratio. When the slip ratio $\lambda$=0, the value of the inertia moment J is set equal to a nominal value $J_n = J_\omega + r^2 M$. Moreover, variation in slip ratio $\lambda$ is considered to be a modeling error $\Delta$. That is, the following formula holds true.

[Formula 67]

$$\frac{\omega}{T} = \frac{1}{Js} \equiv \frac{1}{J_n s}(1 + \Delta) \quad (22)$$

When Formula (22) is rewritten, $\Delta$ is obtained from:

[Formula 68]

$$\Delta = \frac{J_n - J}{J}. \quad (23)$$

Furthermore, the following formula is obtained from Formula (17).

[Formula 69]

$$J_n\dot{\omega} = T + r^2 M\lambda\dot{\omega} = T - d \quad (24)$$

Thus, the disturbance associated with the slip ratio variation is expressed by:

$$d = -r^2 M\lambda\dot{\omega}. \quad \text{[Formula 70]}$$

Then, the slip ratio $\lambda$ is calculated from the disturbance d. Here, $$\hat{d} \quad \text{[Formula 71]}$$

is a disturbance estimated by the disturbance observer. Based on Formula (24), the following formula holds true.

[Formula 72]

$$\hat{\lambda} = -\frac{\hat{d}}{r^2 M\dot{\omega}} \quad (25)$$

Here, a high pass filter is applied for a pseudo differential calculation of:

$$\dot{\omega}. \quad \text{[Formula 73]}$$

Figure 8:
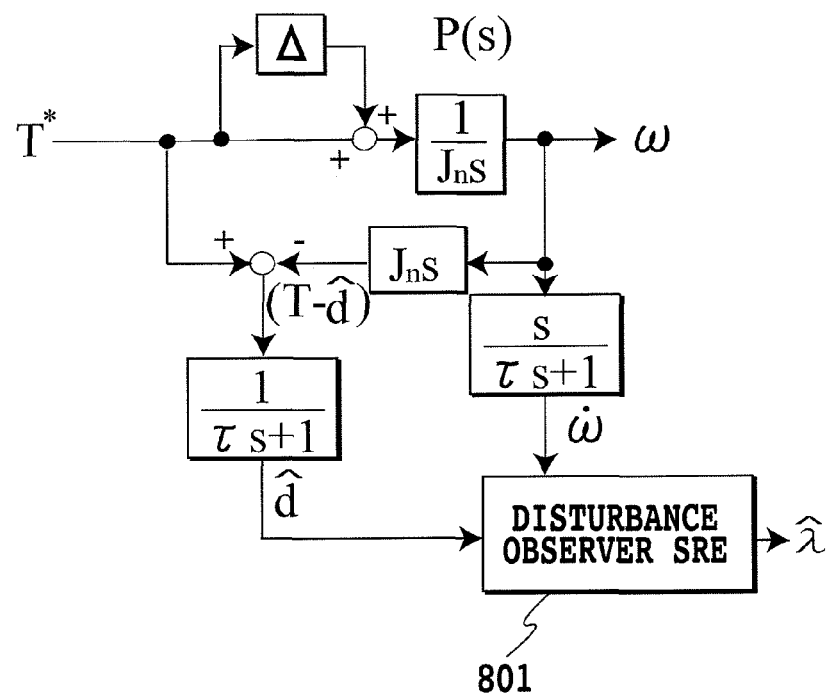
FIG. 8 is a block diagram of slip ratio estimation based on a disturbance observer.

FIG. 8 shows a block diagram of the slip ratio estimation based on the disturbance observer. Processing similar to that in the case of the vehicle model is executed in a portion P(s) enclosed by a dotted line. Processing according to Formula (25) is executed in a disturbance observer SRE 801.

1.5 Verification Based on Simulation

With the above-described three SREs, the slip ratio estimation was simulated. The constants are $J_\omega$=1.0 [Nms$^2$], $J_n$=20.3 [Nms$^2$], M=420 [kg], and r=0.22 [m], which were obtained from a real vehicle. 5.0 [sec] after the beginning of the simulation, the torque target slip ratio T* was set to 100 [m]. The road surface condition was set for a low μ road from startup until the elapsed time reached 3 [sec] ($\mu_{max}$=0.2), and then for a wet surface ($\mu_{max}$=1.0). Furthermore, sampling frequency was set to 10 [kHz].

1.5.1 Estimation Based on the Sequential Least Squares Method

Owing to a large quantization error in a Hall sensor, simulation was performed with the cutoff frequency co, of the high pass filter for a pseudo differential calculation of:

$$\dot{\omega} \qquad \text{[Formula 74]}$$

set to 10 [rad/sec] and with the forgetting coefficient κ set to 0.99.

The estimated slip ratio and the values y and 4 are shown in FIGS. 9A and 9D. The figures show that the estimation is accurate in a steady state in which the slip ratio does not vary significantly but is inaccurate when the slip ratio varies significantly. Such a significant variation is expected to be due to the neglect of the differential item for the slip ratio in Formula (7):

$$\dot{\lambda} \qquad \text{[Formula 75]}$$

1.5.2 Estimation Based on the Disturbance Observer

The cutoff frequency of the low pass filter incorporated in the disturbance observer was set such that $\omega_{lpf}$=30[rad/sec] and $\omega_c$=10[rad/sec]. FIGS. 9B and 9E show the slip ratio estimated by the disturbance observer and $$\hat{d}. \qquad \text{[Formula 76]}$$

This method also neglects the differential item for the slip ratio in Formula (7):

$$\dot{\lambda} \qquad \text{[Formula 77]}$$

Thus, a significant variation in slip ratio prevents the correct estimation.

1.5.3 Estimation Based on First Estimation According to the Present Invention

The first SRE according to the present invention eliminates the need for a slow filter used to remove noise for integration. Thus, the cutoff frequency $\omega_c$ of the high pass filter for a pseudo differential calculation of:

$$\dot{\omega} \qquad \text{[Formula 78]}$$

was set to 500[rad/sec].

Unlike the two other methods, the first SRE according to the present invention estimates the slip ratio taking the time differential value of the slip ratio:

$$\dot{\lambda} \qquad \text{[Formula 79]}$$

into account. Thus, the estimation is correct in spite of a significant variation in slip ratio λ. In this simulation, as shown in FIGS. 9C and 9F, $$\frac{\dot{\omega}}{\omega} \qquad \text{[Formula 80]}$$

may have a negative value, but the estimation error converges to zero without diverging. Compared to the two other methods, the first SRE enables very accurate estimation.

1.6 Offline Verification Using a Real Vehicle

Experiments were carried out with the first SRE according to the present invention and the two other SREs actually mounted in an electric vehicle.

Experimental Environment

The experimental vehicle was obtained by modifying a small electric vehicle (manufactured by CQMOTORS; Qi (QUNO)). The motor was controlled using an inverter system produced by Myway labs Co., Ltd. Furthermore, the motor included a Hall sensor. However, the sensor offered a low resolution of 6 pulses per rotation in terms of electrical angle. Thus, position angle was linearly interpolated for vector control. In this case, the sample frequency was set to 10 [kHz]. Additionally, DSP was used not only for the vector control but also for traction control, posture control, and the like. In the present verification, an acceleration sensor was used to measure the body speed. Furthermore, the low μ road was realized by using a plastic duckboard and pouring a detergent all over the duckboard.

In the experiments, the torque target slip ratio T* was set to 80 [Nm]. Furthermore, the electric vehicle traveled on a low μ road from startup until the elapsed time reached about 3 [sec] and then on a dry road. FIG. 10 show experimental results for the body speed and the wheel speed obtained when the electric vehicle traveled without being subjected to the slip ratio control. FIG. 10 shows that the speed fails to exhibit an increase as the wheel speed increases. This is expected to be due to a counter electromotive force.

1.6.1 Estimation Based on the Sequential Least Squares Method

As is the case with the simulation, experiments were carried out with the cutoff frequency $\omega_c$ of the high pass filter set to 10[rad/sec] and the forgetting coefficient κ set to 0.99. FIGS. 11A and 11D shows the slip ratio estimated by the sequential least square method and the values y and ξ. Unlike in the case of the simulation, a quantization error in the Hall sensor causes pulsation in:

$$\dot{\omega}. \qquad \text{[Formula 81]}$$

This affects the value of ξ, resulting in an estimation error. Furthermore, since as is the case with the simulation, the differential term for the slip ratio:

$$\dot{\lambda} \qquad \text{[Formula 82]}$$

is not taken into account, a significant variation in slip ration prevents the correct estimation. Furthermore, since a slow filter is applied in order to inhibit possible pulsation in:

$$\dot{\omega}, \qquad \text{[Formula 83]}$$

when variation occurs, this technique fails to quickly follow the true value.

1.6.2 Estimation Based on the Disturbance Observer

Experiments were carried out under conditions similar to those for the simulation. FIGS. 11B and 11E show the slip ratio estimated by the disturbance observer and the value of:

$$\hat{d}. \qquad \text{[Formula 84]}$$

Even with this technique, a quantization error in the Hall sensor results in an estimation error. Furthermore, a significant variation in slip ration prevents the correct estimation.

1.6.3 Estimation Based on the First SRE

FIGS. 11C and 11F show the slip ratio estimated using the first SRE and a temporal change in:

$$\frac{\dot{\omega}}{\omega}. \qquad \text{[Formula 85]}$$

Unlike the other techniques, the first SRE performs integration to determine the slip ratio λ and thus eliminates the need to apply a slow filter in spite of pulsation. Furthermore, even with variation in slip ratio λ, the first SRE enables accurate estimation. Additionally, an unstable condition in which:

$$\frac{\dot{\omega}}{\omega} < 0 \qquad \text{[Formula 86]}$$

is theoretically present. However, the estimation error is very small as is the case with the simulation results.

1.7 Slip Control

Also for the slip ratio control, the conventional slip ratio control will be described for comparison.

1.7.1 Anti-Slip Control

The conventional control method using the above-described disturbance observer for slip control will be described. The following formula is obtained from Formula (24).

[Formula 87]

$$J_n\dot{\omega} = T + \Delta J\dot{\omega} \qquad (26)$$

The second term on the right side, corresponding to variation in plant, is considered to be a disturbance. Here, in order to inhibit a possible disturbance, the disturbance observer is utilized to perform anti-slip control. However, the EV also involves wasteful time of several [ms] during detection of an angular speed by an encoder or between issuance of the torque instruction and actual generation of a torque, though the value of the time is relatively small compared to that in the ICEV. Thus, an observer gain K needs to be adjusted taking the uncertain value Δ and the wasteful time. FIG. 12 shows a block diagram of the anti-slip control.

With wasteful time taken into account, the observer gain K was set to 0.7 and the cutoff frequency $\omega_{lpf}$ of the low pass filter was set to 1/τ30 [rad/sec]; these values were experimentally obtained via tuning. These values match values obtained by analysis in Non-Patent Document 4 with the wasteful time taken into account. In the experiments, the vehicle traveled on a low μ road. FIGS. 13A, 13B, and 13C show temporal changes in slip ratio, wheel speed, and body speed, corresponding to experimental results for the anti-slip control using the real vehicle. The figures show that the slip ratio was reduced but failed to reach an optimum value because the wasteful time was taken into account.

1.7.2 First Slip Ratio Control

FIGS. 21A and 21B show the slip ratio, wheel speed, and body speed experimentally obtained with the first slip ratio control device actually mounted in the electric vehicle. While the elapsed time from startup was between 0.5 [sec] and 2 [sec], a low torque instruction value was provided to allow the slip ratio to be estimated. After the elapsed time reached 2 [sec], the target slip ratio μ*=0.2 was input in steps. Thus, in spite of slight pulsation, the slip ratio was successfully controlled to the target value μ* of 0.2.

1.8 Summary

The estimation based on the sequential least square method or the disturbance observer is profoundly affected by a significant variation in slip ratio or noise in the angular acceleration of the wheels. In contrast, the first SRE according to Embodiment 1 enables the slip ratio to be accurately estimated without being affected by such variation or noise. Furthermore, the conventional slip control, which does not use the body speed, has difficulty controlling the slip ratio to the optimum value. However, the present embodiment enables the slip ratio to be controlled to the optimum value.

Embodiment 2

With the first SRE according to the Embodiment 1, described above, given only the driving period, during which the rotation speed ω of the wheels is positive, when the rotation acceleration of the wheels:

$$\dot{\omega} \qquad \text{[Formula 88]}$$

becomes negative, the estimation error may disadvantageously expand. If the condition of the vehicle becomes unstable to expand the error while the rotation speed ω of the wheels is high, then even when the condition is stabilized, a long time is required to converge the error. The present embodiment performs slip ratio control using a second SRE, to compensate for the unstable region.

2.1 Second SRE

As described above, the estimation error e (t) defined by Formula (10) does not converge monotonously in the region in which:

$$\frac{\dot{\omega}}{\omega} < 0. \qquad \text{[Formula 89]}$$

To compensate for the unstable region, a slip ratio observer (SRO) is added to Formula (9) as a compensation item as follows:

[Formula 90]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M\omega} + k(\hat{\lambda})\left(\dot{V} - \dot{\hat{V}}\right) \qquad (27)$$

Based on Formulae (8) and (27), the following formula is obtained for the estimation error e(t).

[Formula 91]

$$\begin{aligned}
\dot{e} &= \dot{\lambda} - \dot{\hat{\lambda}} \qquad (28)\\
&= -\frac{\dot{\omega}}{\omega}e - k(\hat{\lambda})\left(\dot{V} - \dot{\hat{V}}\right)\\
&= -\frac{\dot{\omega}}{\omega}e - \frac{k(\hat{\lambda})}{M}\left(F_d(\lambda) - F_d(\hat{\lambda})\right)
\end{aligned}$$

As shown in FIG. 15, based on the relationship between a driving force $F_d$ and the slip ratio λ, the following formula is obtained.

[Formula 92]

$$\frac{F_d(\lambda) - F_d(\hat{\lambda})}{\lambda - \hat{\lambda}} \simeq a(\hat{\lambda}) \qquad (29)$$

In this formula, $$a(\hat{\lambda}) \qquad \text{[Formula 93]}$$

denotes the inclination of a μ-λ curve. Based on Formulae (28) and (29), the estimation error e(t) is:

[Formula 94]

$$\dot{e} = -\left(\frac{\dot{\omega}}{\omega} + \frac{k(\hat{\lambda})}{M}a(\hat{\lambda})\right)e. \quad (30)$$

Thus, a stable condition is ensured provided that the following formula holds true.

$$\frac{\dot{\omega}}{\omega} + \frac{k(\hat{\lambda})}{M}a(\hat{\lambda}) > 0 \quad \text{[Formula 95]}$$

Formula (31) can be modified into Formula (32). An observer gain:

$$k(\hat{\lambda}) \quad \text{[Formula 96]}$$

which satisfies Formula (32) needs to be selected.

[Formula 97]

$$k(\hat{\lambda}) > \frac{M}{a(\hat{\lambda})}\left(-\frac{\dot{\omega}}{\omega}\right) \quad (32)$$

When the observer in Formula (27) is actually utilized, since the true value of:

$$\dot{V} \quad \text{[Formula 98]}$$

is unknown, the value $a_x(t)$ from the acceleration sensor is utilized to set:

$$\dot{V} = a_x(t) \quad \text{[Formula 99]}$$

Furthermore, for:

$$\dot{V} \quad \text{[Formula 100]}$$

a μ-λ curve model for a low μ road is assumed. Thus, first, with the friction coefficient μ defined as an explicit function for:

$$\hat{\lambda}, \quad \text{[Formula 101]}$$

Formula (6) is rewritten into:

[Formula 102]

$$F_d(\hat{\lambda}) = N\lambda(\hat{\lambda}) \quad (33)$$

Furthermore, the following formula that is equivalent to Formula (2) is prepared.

[Formula 103]

$$M\dot{V} = F_d \quad (34)$$

The following formula is obtained from Formulae (33) and (34)

[Formula 104]

$$\dot{V} = \frac{F_d(\hat{\lambda})}{M} = \frac{N}{M}\mu(\hat{\lambda}) \quad (35)$$

In this formula, N denotes vertical resistance per wheel. These formulae can be combined into:

[Formula 105]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + k(\hat{\lambda})\left(a_x(t) - \frac{N}{M}\mu(\hat{\lambda})\right). \quad (36)$$

The fourth item on the left side of Formula (36) is called the slip ratio observer. The SRE including the slip ratio observer is the second SRE. FIG. 22 is a block diagram of slip ratio estimation using the second slip ratio estimator according to Embodiment 2. The motor torque T* measured by the torque measuring instrument and the acceleration $a_x$ of the body measured by the acceleration sensor are input to a vehicle model 2201 and a second SRE 2202 based on Formula (36), respectively. The vehicle model 2201 derives the wheel rotation speed ω, the wheel rotation acceleration:

$$\dot{\omega}, \quad \text{[Formula 106]}$$

and the body speed V, and outputs the wheel rotation speed ω and the wheel rotation acceleration:

$$\dot{\omega} \quad \text{[Formula 107]}$$

to the second SRE 2202. Based on the motor torque T*, the wheel rotation speed ω, and the wheel rotation acceleration:

$$\hat{\lambda}. \quad \text{[Formula 108]}$$

the second SRE 2202 outputs the slip ratio:

$$\hat{\lambda}. \quad \text{[Formula 109]}$$

2.2 Slip Ratio Control Using the Second SRE

FIG. 14 shows a block diagram of second slip ratio control according to Embodiment 2. The second slip ratio control corresponds to the slip ratio control according to Embodiment 1 in which the second SRE is replaced with the second SRE. The second slip ratio control uses the second SRE and a PI controller.

Here, as described above, the case where ω>0 will be considered. When the slip ratio λ is equal to or higher than the optimum value, the wheels rotate idly. Thus, it is expected that:

$$\dot{\omega} > 0. \quad \text{[Formula 110]}$$

Consequently, it is sufficient to perform only estimation based on Formula (9) as is the case with Embodiment 1. Therefore, the observer gain:

$$k(\hat{\lambda}) \quad \text{[Formula 111]}$$

is provided. Furthermore, an increase in:

$$k(\hat{\lambda}) \quad \text{[Formula 112]}$$

speeds up the convergence to the true value but may result in an unstable condition because of an error in modeling of the λ-μ curve. Thus, the observer gain:

$$k(\hat{\lambda})\text{[Formula 113]}$$

needs to be determined with the tradeoff between the convergence property and robustness taken into account. FIG. 16 shows a relationship between the observer gain and the estimated value of the slip ratio. In simulation described below, k(0)=1, which is set as shown in FIG. 16. The inclination of the graph is intended to prevent possible chattering. When:

$$\hat{\lambda} > \lambda_{opt}, \quad \text{[Formula 114]}$$

that is, when the slip ratio is higher than the optimum value, $$k(\hat{\lambda}) = 0 \quad \text{[Formula 115]}$$

Thus, a friction coefficient model:

$$\mu(\hat{\lambda})  \quad\quad \text{[Formula 116]}$$

requires only a region in which the slip ratio is equal to or lower than the optimum value. Thus, a model expressed by:

[Formula 117]

$$\mu(\hat{\lambda}) = C_s \hat{\lambda} \quad\quad (37)$$

was provided which used driving stiffness $C_s$, the inclination of the vicinity of zero on the λ-λ curve. In the present embodiment, $C_s$ is set to 1.0, corresponding to the value of the low μ road, so as to offer a sufficient inclination even with the low μ road.

Even when:

$$\frac{\dot{\omega}}{\omega} < 0, \quad\quad \text{[Formula 118]}$$

the second SRE enables the slip ratio to be quickly converged to the true value. That is, the second SRE compensates for a region that is unstable in the case of the first SRE. This enables the slip ratio to be accurately estimated even with a significant change in a road surface condition.

2.3 Simulation

For simulation conditions, the constants have the following values obtained from the real vehicle: $J_\omega$=1.0 [Nms²], M=420 [kg], and r=0.22 [m]. When the elapsed time from startup reaches 0.5[sec], the torque target slip ratio T* is set to 100 [Nm]. When the elapsed time from startup reaches 5 [sec], the road surface condition is set for a dry road ($\mu_{max}$=1.0). In the present simulation, to allow for an estimation error to verify the observer, estimation is started when the elapsed time reaches 0.05 [sec], so that:

$$\frac{\dot{\omega}}{\omega} \quad\quad \text{[Formula 119]}$$

becomes sufficiently small. FIG. 17 shows simulation results for estimation using the first and second SREs. FIG. 17 shows that with the SREs, the estimation error expands until the elapsed time reaches 5 [sec] and then the value of:

$$-\frac{\dot{\omega}}{\omega} \quad\quad \text{[Formula 120]}$$

decreases, thus delaying the convergence. However, FIG. 17 shows that with the proposed slip ratio observer, the value converges to the true one. Furthermore, after the road surface changes, $C_s$=about 5, which is about five times as large as that observed before the road surface change. However, the slip ratio converges to the true value.

2.4 Offline Experiments

The experimental vehicle was obtained by modifying the small electric vehicle (manufactured by CQMOTORS; Qi(QUNO)). The motor was controlled using the inverter system produced by Myway labs Co., Ltd. Furthermore, the motor included the Hall sensor. However, the sensor offered a low resolution of 6 pulses per rotation in terms of electrical angle. Thus, the position angle was linearly interpolated for vector control. In this case, the sample frequency was set to 10 [kHz]. Additionally, DSP was used not only for the vector control but also for traction control, posture control, and the like. In the present verification, the acceleration sensor was used to measure the body speed. Furthermore, the low μ road was realized by using the plastic duckboard and pouring the detergent all over the duckboard. In the experiments, the torque target slip ratio T* was set to 80 [Nm]. Furthermore, the electric vehicle traveled on the low μ road from startup until the elapsed time reached about 3 [sec] and then on the dry road. As is the case with the simulation, the μ-λ curve for the low t road is assumed based on Formula (37).

FIG. 18 shows experimental results for the estimation using the first and second SREs. A denotes the true value of the slip ratio.

$$\lambda_{est} \quad\quad \text{[Formula 121]}$$

denotes an estimated value obtained using the first SRE.

$$\hat{\lambda}_{obs} \quad\quad \text{[Formula 122]}$$

denotes an estimated value obtained using the second SRE. With the first SRE, the convergence to the true value after the expansion of the error is delayed by the lack of compensation. In contrast, the second slip ratio control enables quick convergence to the true value without the need for the body speed.

2.5 Summary

As described above, the second SRE according to the present embodiment enables accurate slip ratio estimation without the need for the body speed.

Embodiment 3

3.1 Nonlinear Control Based on Feedback Linearization

The slip ratio control used in Embodiments 1 and 2 may make an error owing to the linearization in Formula (12). Thus, the slip ratio control according to the present embodiment controls the slip ratio by performing nonlinear control based on feedback linearization.

Based on (8), by incorporating the following formula into a minor loop for nonlinear compensation, characteristics from slip ratio λ to slip ratio v can be linearized into:

$$\dot{\lambda} = v \quad\quad \text{[Formula 123]}$$

[Formula 124]

$$T^* = r^2 M \omega \left( -\frac{\dot{\omega}}{\omega} \lambda + \left(1 + \frac{J_\omega}{r^2 M}\right) \frac{\dot{\omega}}{\omega} + V \right) \quad\quad (38)$$

The processing in FIG. (38) is defined as a nonlinear compensator. Furthermore, the present embodiment uses a proportional controller. Thus, the following formula holds true.

[Formula 125]

$$\dot{\lambda} = v = K_p(\lambda^* - \lambda) \quad\quad (39)$$

Consequently, Formula (39) can be modified into such a 1st-order lag system as expressed by:

[Formula 126]

$$\lambda = \frac{K_p}{s + K_p} \lambda^*. \quad\quad (40)$$

FIG. 19 shows a block diagram of third slip ratio control according to Embodiment 3. The target slip ratio λ* is input to block 1901. Block 1901 derives v based on Formula (39) and outputs this value to a nonlinear compensator 1902. The nonlinear compensator 1902 derives the motor torque T* based on Formula (38) and inputs this value to a vehicle model 1903 and a second RSE 1904. The vehicle model 1903 inputs the derived wheel rotation speed (o and rotation acceleration:

$$\dot{\omega} \quad \text{[Formula 127]}$$

to each of the nonlinear compensator 1902 and the second SRE 1904. Based on the motor torque T*, the wheel rotation speed ω, the wheel rotation acceleration:

$$\dot{\omega}, \quad \text{[Formula 128]}$$

the second SRE 1904 derives and inputs the slip ratio:

$$\hat{\lambda} \quad \text{[Formula 129]}$$

to each of block 1901 and the nonlinear compensator 1902. By generating a torque instruction based on the value of T* output from the nonlinear compensator 1902, the slip ratio λ can be converged to the target slip ratio λ*. The present embodiment uses the second SRE to estimate the slip ratio λ. However, the first SRE may be used.

3.2 Simulation

FIG. 20 shows simulation results for the third slip control. As simulation conditions, T* was maintained at 100 [Nm] for slip ratio estimation until the elapsed time reached 0.05 [sec]. When the elapsed time reached 0.05 [sec], the slip ratio was estimated, and then the slip ratio control was performed. Furthermore, the target slip ratio was set three different values, 0.1, 0.2, and 0.3. FIG. 20 shows that the slip ratio successfully followed all of the target slip ratio values.

3.3 Summary

As described above, the slip ratio control device according to the present embodiment enables very accurate slip ratio control without the need for the body speed.

Embodiment 4

4.1 Third SRE

DRE-SRE: Driving Resistance Estimator-Slip Ratio Estimator

The first and second SREs estimate the slip ratio with the driving resistance considered to be zero. However, the driving resistance is known to affect the slip ratio estimation. Thus, estimating the driving resistance to compensate for the SRE enables the accuracy of the SRE to be further improved.

First, a driving force observer is used to estimate the driving force $F_d$ according to Formula (1) (see Non-Patent Document 5). According to Formula (2), driving resistance $F_{dr}$ is estimated using the estimated driving force and the value $a_x$ from the acceleration sensor. FIG. 23 shows a block diagram of a driving resistance estimator (DRE). The estimated driving resistance:

$$\hat{F}_{dr} \quad \text{[Formula 130]}$$

obtained by the driving resistance estimator is used to estimate the slip ratio.

Both sides of Formula (4) are subjected to time differentiation with the driving resistance remaining unchanged. Formulae (1) to (3) are then substituted into the resultant formula to erase $V_\omega$, V, and $F_d$ to obtain:

[Formula 131]

$$\dot{\omega} = \frac{T - rF_{dr} + r^2 M \omega \dot{\lambda}}{J_\omega + r^2 M(1-\lambda)}. \tag{41}$$

Formula (41) is further rewritten into:

[Formula 132]

$$\dot{\lambda} = -\frac{\dot{\omega}}{\omega}\lambda + \left(1 + \frac{J_\omega}{r^2 M}\right)\frac{\dot{\omega}}{\omega} - \frac{T}{r^2 M \omega} + \frac{rF_{dr}}{r^2 M \omega}. \tag{42}$$

Thus, the estimate value of the slip ratio is obtained by the following formula using the estimated value from the driving resistance estimator.

[Formula 133]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + \frac{\hat{F}_{dr}}{rM\omega} \tag{43}$$

FIG. 24 shows a block diagram of the slip ratio estimation using the third slip ratio estimator. An estimated value of driving resistance is loaded into a DRE-SRE 2401 that is the third SRE. Then, based on Formula (43), the DRE-SRE 2401 performs calculations similarly to the other SREs.

4.2 Fourth SRE

DRE-SRO

Based on Formulae (8) and (43), an estimation error in the slip ratio estimation using the third SRE is as follows:

[Formula 134]

$$\frac{d}{dt}e(t) = -\frac{\dot{\omega}}{\omega}e(t) + \frac{1}{rM\omega}\left(F_{dr} - \hat{F}_{dr}\right) \tag{44}$$

That is, if the true value of the driving resistance is perfectly equal to the estimated value thereof, the estimation error caused by the driving resistance is eliminated. This enables accurate estimation. However, as is the case with the first SRE, the estimation is unstable in the region in which:

$$\frac{\dot{\omega}}{\omega} < 0. \quad \text{[Formula 135]}$$

Thus, the slip ratio estimation using the fourth SRE not only compensates for the driving resistance but also performs compensation by the SRO, used for the second SRE. That is, a compensation item is added to Formula (43) as follows:

[Formula 136]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + \frac{\hat{F}_{dr}}{rM\omega} + k(\hat{\lambda})(\dot{V} - \dot{\hat{V}}) \quad (45)$$

In the formula, $$k(\hat{\lambda}) \quad \text{[Formula 137]}$$

is an observer gain. The following formula is obtained from Formulae (8) and (45).

[Formula 138]

$$\frac{d}{dt}e = -\frac{\dot{\omega}}{\omega}e - k(\hat{\lambda})(\dot{V} - \dot{\hat{V}}) + \frac{F_{dr} - \hat{F}_{dr}}{rM\omega} \quad (46)$$

$$= -\frac{\dot{\omega}}{\omega}e - \frac{k(\hat{\lambda})(F_d(\lambda) - F_d(\hat{\lambda}) - (F_{dr} - \hat{F}_{dr}))}{M} + \frac{F_{dr} - \hat{F}_{dr}}{rM\omega}$$

Based on Formulae (46) and (29), the estimation error is expressed by:

[Formula 139]

$$\frac{d}{dt}e = -\left(\frac{\dot{\omega}}{\omega} + \frac{k(\hat{\lambda})}{M}a(\hat{\lambda})\right)e + \frac{F_{dr} - \hat{F}_{dr}}{rM\omega}. \quad (47)$$

The difference between the true and estimated values of the driving resistance:

$$F_{dr} - \hat{F}_{dr} \quad \text{[Formula 140]}$$

converges sufficiently quickly to zero provided that LPFs 2303 and 2306 in FIG. 24 have sufficiently small time constants. Consequently, when Formula (31) holds true, the estimation is ensured to be stable. Thus, an observer gain is selected which satisfies Formula (32) into which Formula (31) can be modified.

When the observer expressed by Formula (45) is actually utilized, the true and estimated values of the body acceleration are set as follows. The value $a_x(t)$ from the acceleration sensor is utilized to set:

$$\dot{V} = a_x(t) \quad \text{[Formula 141]}$$

Furthermore, based on Formulae (2), (6), and (33) and the DRE,

[Formula 142]

$$\dot{\hat{V}} = \frac{F_d(\hat{\lambda}) - \hat{F}_{dr}}{M} = \frac{N}{M}\mu(\hat{\lambda}) - \frac{\hat{F}_{dr}}{M} \quad (48)$$

is obtained. These formulae can be combined into:

[Formula 143]

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \quad (49)$$

$$\frac{T}{r^2 M\omega} + \frac{\hat{F}_{dr}}{rM\omega} + k(\hat{\lambda})\left(a_x(t) - \frac{N}{M}\mu(\hat{\lambda}) + \frac{\hat{F}_{dr}}{M}\right).$$

Formula (49) is defined as a slip ratio observer. As is the case with the second SRE, Formula (37) is used to set $C_s=1$. FIG. 25 shows a block diagram of the slip ratio estimation using the fourth SRE. An estimated value of driving resistance and the acceleration are loaded into a DRE-SRO 2501 that is the fourth SRE. Then, based on Formula (49), the DRE-SRO 2501 performs calculations similarly to the other SREs.

4.3 Simulation

As simulation conditions, T* is maintained constant at 80 [Nm]. Furthermore, the vehicle travels on a low μ road ($\mu_{max}=0.2$) from startup until the elapsed time reaches 1 second, then travels on a high μ road ($\mu_{max}=1.0$).

Additionally, the driving resistance is documented such that rolling resistance is dominant in a low speed region such as at normal startup and accounts for about 10% of the driving force (see Non-Patent Document 6). In the present experiments, the driving force $F_d$ obtained during traveling on a dry road was about 500 [N]. Thus, the driving resistance was maintained at 50 [N], which accounts for about 10% of the driving force. Moreover, to intentionally allow for an initial estimation error, the estimation was not performed at startup but was started 0.01 [sec] after the startup.

FIGS. 26A to 26C show simulation results for slip ratio estimation using the SRE, DRE-SRE, and DRE-SRO. FIG. 27 show results of driving resistance estimation used for the DRE-SRE and DRE-SRO.

As shown in FIG. 26A, no significant estimation error was observed during traveling on the low μ road. However, a significant estimation error occurred during traveling on the high μ road. This is expected to be because during traveling on the low μ road, the wheel angular speed ω increases to reduce the effect of the driving resistance $F_{dr}$, but because after the vehicle enters the high μ road, the wheel angular speed ω decreases, making the effect of the driving resistance $F_{dr}$ unignorable.

The figures show that the DRE-SRE (FIG. 26B) and DRE-SRO (FIG. 26C), which take the driving resistance into account, successfully estimated the slip ratio accurately for all the regions. To describe these two techniques in detail, FIG. 28 will be referenced which shows estimation errors in the slip ratio estimation using the DRE-SRE and DRE-SRO. FIG. 28 shows that in a region in which:

$$\frac{\dot{\omega}}{\omega} < 0 \quad \text{[Formula 144]}$$

and the estimation error expands, the DRE-SRO, which compensates for unstable regions, inhibits the expansion of the estimation error compared to the DRE-SRE.

4.4 Offline Experiments

The SRE, DRE-SRE, and DRE-SRO were compared with one another through offline experiments. As offline experimental conditions, the torque instruction value is set such that T* is maintained constant at 80 [Nm], as is the case with the simulation. The vehicle travels on a low p road from startup until the elapsed time reaches about 3 seconds and then on a high μ road.

FIGS. 29A to 29C show simulation results for slip ratio estimation using the SRE, DRE-SRE, and DRE-SRO. FIG. 30 show results of driving resistance estimation used for the DRE-SRE and DRE-SRO.

As shown in FIG. 29A, no significant estimation error was observed during traveling on the low μ road, but an estimation error occurred during traveling on the high μ road, as is the case with the simulation.

The figures show that the DRE-SRE (FIG. 29B) and DRE-SRO (FIG. 29C), which take the driving resistance into account, also successfully estimated the slip ratio accurately for all the regions.

Moreover, FIG. 31 shows the results of offline experiments on estimation errors in the slip ratio estimation using the DRE-SRE and DRE-SRO. FIG. 31 shows that for the DRE-SRO, the estimation error expanded during re-sticking and then converged quickly.

Embodiment 5

5.1 Slip Ratio Control Based on Feed Forward Control

FIG. 32 shows a block diagram of slip ratio control using the DRE-SRE or DRE-SRO. The slip ratio control performs nonlinear compensation based on Formulae (38) and (39) as in the case of Embodiment 3.

For the controller, the cutoff frequency of a high pass filter (HPF) 3206 for a pseudo differential calculation of:

$$\dot{\omega}$$ [Formula 145]

was set to 10 [rad/s]. The road surface condition was such that the vehicle traveled constantly on a low μ road ($\mu_{max}$=0.2). Furthermore, Kp=70. To allow estimation to be performed, a constant torque instruction value T*=80 [Nm] was provided from startup until the elapsed time reached 0.03 seconds. After the elapsed time reached 0.03 seconds, a slip ratio instruction value λ=0.2 was input in steps.

FIG. 33 shows simulation results for the slip ratio control using the DRE-SRE or DRE-SRO. Even with a significant undershoot, the slip ratio converged to the instruction value in about 0.13 seconds.

FIG. 34 shows the results of experiments on the slip ratio control using the DRE-SRE or DRE-SRO; the experiments used the real vehicle. As is the case with the simulation, the road surface condition was such that the vehicle traveled constantly on a low μ road ($\mu_{max}$=0.2). To allow estimation to be performed, the torque instruction value T* was set to 80 [Nm] from startup until the elapsed time reached about 2 seconds. After the elapsed time reached 2.3 seconds, a slip ratio instruction value λ*=0.2 was input in steps. Then, as is the case with the simulation, the slip ratio followed the instruction value.

However, in spite of the convergence to the instruction value, significant pulsation occurred. Possible causes of the pulsation are noise in:

$$\dot{\omega}$$ [Formula 146]

resulting from the low resolution of the motor sensor and the very slow cutoff frequency of the HPF 3206, that is, 10 [rad/s].

Thus, on the assumption that the driving resistance is negligibly small, λ is set equal to λ* so as to maintain the slip ratio constant. Then, the following formula is obtained based on Formula (41).

[Formula 147]

$$\dot{\omega} = \frac{T}{J_\omega + r^2 M(1-\lambda^*)} \tag{50}$$

This formula is substituted into Formula (24). Then, $$\dot{\omega}$$ [Formula 148]

is provided on a feed forward basis to enable a reduction in the adverse effect of the noise. FIG. 35 shows a block diagram of slip ratio control based on feed forward control. Instead of the HPF 3206, Formula (50) is incorporated into the controller to provide:

$$\dot{\omega}$$ [Formula 149]

on a feed forward basis.

5.2 Simulation

FIG. 36 shows simulation results for the slip ratio control based on the feed forward control. Simulation was performed under conditions similar to those used for the simulation in FIG. 33. FIG. 36 shows that although the nonlinear item was not accurately canceled, the slip ratio followed the instruction value without causing an unstable condition.

5.3 Offline Experiments

FIG. 37 shows the results of experiments on the slip ratio control based on the feed forward control; the experiments used the real vehicle. The experiments were carried out under the same conditions as those for the simulation. FIG. 37 shows that the slip ratio followed the instruction value and that the pulsation was reduced compared to that shown in the results of the slip ratio control using the HPF (FIG. 34).

Embodiment 6

6.1 Slip Ratio Control Based on Rotation Speed Control Using a Variable Gain

Since the wheel speed is known, the estimation of the slip ratio is equivalent to the estimation of the body speed. Accurate slip ratio estimation allows the body speed to be obtained using the following formula based on Formula (4). In this case, $V_\omega = r\omega$.

[Formula 150]

$$\hat{V} = r\omega(1-\hat{\lambda}) \tag{51}$$

Then, determining the body speed allows a target wheel speed for the target slip ratio to be determined.

[Formula 151]

$$\omega^* = \frac{\hat{V}}{r(1-\lambda^*)} \tag{52}$$

Thus, the slip ratio control can be performed by using common rotation speed control in which a speed control loop is provided outside a motor current control loop. However, the inertia moment varies depending on the slip ratio based on Formula (41). Thus, fixing a control gain may relatively vary poles in response to variation in slip ratio.

Thus, based on the following formula taking into account the inertia moment, varying depending on the slip ratio, the control gain is varied depending on the slip ratio based on the pole placement method, to inhibit a possible variation in poles.

[Formula 152]

$$\omega = \frac{1}{(J_\omega + r^2 M(1-\lambda))s} T \tag{53}$$

FIG. 38 shows a block diagram of the slip ratio control based on the rotation control using the variable gain. An estimated slip ratio calculated by an SRE 3703 is loaded into a proportional-plus-integral controller 3701, which then calculates the target torque T* based on Formula (53).

6.2 Simulation

The poles of a speed control system are set for 70 [rad/s]. FIG. 39 shows simulation results for the slip ratio control based on the rotation control using the variable gain. Simulation was performed with conditions similar to those described above. FIG. 39 shows that the slip ratio followed the target value, though the speed at which the slip ratio followed the target value was lower than that shown in FIG. 36 for Embodiment 5.

6.3 Offline Experiments

FIG. 40 shows the results of experiments on the slip ratio control based on the rotation control using the variable gain; the experiments used the real vehicle. Simulation was performed with conditions similar to those described above. FIG. 40 shows that the slip ratio followed the instruction value and the pulsation observed under this control was smaller than those observed under the other types of slip ratio control described above.

The invention claimed is:

1. A slip ratio estimating device in an automobile using a torque (T) of a motor to drive drive wheels, the slip ratio estimating device comprising:
motor torque measuring means for measuring the torque of the motor;
vehicle model calculating means for calculating a drive wheel rotation speed ($\omega$) and a drive wheel rotation acceleration
($\dot{\omega}$); and
slip ratio calculating means for calculating an estimated slip ratio
($\hat{\lambda}$)
by using the torque measured by the motor torque measuring means and the rotation speed and rotation acceleration calculated by the vehicle model calculating means to calculate an ordinary differential equation for a slip ratio.

2. The slip ratio estimating device according to claim 1, wherein the slip ratio calculating means calculates the estimated slip ratio by calculating Formula (A) as the ordinary differential equation for the slip ratio, wherein Formula (A) comprises:

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega}$$

(r: tire radius of the drive wheel, M: vehicle weight, $J_\omega$: inertia moment of a drive wheel rotating portion).

3. The slip ratio estimating device according to claim 2, wherein the slip ratio calculating means performs the calculation by adding a slip ratio observer based on an estimated error in body acceleration to a right side of Formula (A).

4. The slip ratio estimating device according to claim 3, further comprising acceleration measuring means for measuring a body acceleration ($a_x$) of the automobile, wherein the slip ratio calculating means performs the calculation by adding the slip ratio observer to the right side of Formula (A).

5. The slip ratio estimating device according to claim 4, wherein the slip ratio calculating means calculates Formula (B) in which the slip ratio observer is added to the right side of Formula (A), wherein Formula (B) comprises:

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + k(\hat{\lambda})\left(a_x(t) - \frac{N}{M}\mu(\hat{\lambda})\right)$$

(k: observer gain, N: vertical resistance offered to one wheel, $\mu$: friction coefficient).

6. The slip ratio estimating device according to claim 1, further comprising:
acceleration measuring means for measuring a body accelerator ($a_x$) of the automobile;
driving force calculating means for calculating an estimated value of a driving force of the automobile; and
driving resistance calculating means for calculating an estimated value of driving resistance ($F_{dr}$) from the estimated driving force calculated by the driving force calculating means and the body acceleration measured by the acceleration measuring means,
wherein the slip ratio calculating means for calculating an estimated slip ratio
($\hat{\lambda}$)
by using the estimated driving resistance calculated by the driving resistance calculating means in addition to the torque measured by the motor torque measuring means and the rotation speed and rotation acceleration calculated by the vehicle model calculating means to calculate an ordinary differential equation for a slip ratio.

7. The slip ratio estimating device according to claim 6, wherein the slip ratio calculating means calculates the estimated slip ratio by calculating Formula (C) as the ordinary differential equation for the slip ratio, wherein Formula (C) comprises:

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + \frac{\hat{F}_{dr}}{r M \omega}$$

(r: tire radius of the drive wheel, M: vehicle weight, $J_\omega$: inertia moment of a drive wheel rotating portion).

8. The slip ratio estimating device according to claim 7, wherein the slip ratio calculating means performs the calculation by adding a slip ratio observer based on an estimated error in body acceleration to a right side of Formula (C).

9. The slip ratio estimating device according to claim 8, wherein the slip ratio calculating means calculates Formula (D) in which the slip ratio observer is added to the right side of Formula (C), wherein Formula (D) comprises:

$$\dot{\hat{\lambda}} = -\frac{\dot{\omega}}{\omega}\hat{\lambda} + \left(1 + \frac{J_\omega}{r^2 M}\right)\frac{\dot{\omega}}{\omega} - \frac{T}{r^2 M \omega} + \frac{\hat{F}_{dr}}{r M \omega} + k(\hat{\lambda})\left(a_x(t) - \frac{N}{M}\mu(\hat{\lambda}) + \frac{\hat{F}_{dr}}{M}\right)$$

(k: observer gain, N: vertical resistance offered to one wheel, $\mu$: friction coefficient).

10. An automobile using a torque of a motor to drive drive wheels, the automobile comprising the slip ratio estimating device according to claim 1, wherein the torque of the motor is controlled such that an estimated slip ratio calculated by the slip ratio estimating device has a desired value.

* * * * *